(12) United States Patent
Swamy et al.

(10) Patent No.: US 11,030,166 B2
(45) Date of Patent: Jun. 8, 2021

(54) SMART DATA TRANSITION TO CLOUD

(71) Applicant: ACCENTURE GLOBAL SOLUTIONS LIMITED, Dublin (IE)

(72) Inventors: Jayant Swamy, Bangalore (IN); Aniruddha Ray, Bangalore (IN); Namratha Maheshwary, Bangalore (IN); Sandeep Kumar Singh, Bangalore (IN); Tanmay Mondal, Kolkata (IN); Hariprasad Natarajan, Trichy (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 261 days.

(21) Appl. No.: 16/413,343

(22) Filed: May 15, 2019

(65) Prior Publication Data

US 2020/0167323 A1    May 28, 2020

(30) Foreign Application Priority Data

Nov. 22, 2018   (IN) .............................. 201811044050

(51) Int. Cl.
*G06F 16/21*   (2019.01)
*G06F 16/25*   (2019.01)
*G06F 11/34*   (2006.01)
*G06F 16/2453*   (2019.01)

(52) U.S. Cl.
CPC ........ *G06F 16/214* (2019.01); *G06F 11/3409* (2013.01); *G06F 16/2453* (2019.01); *G06F 16/254* (2019.01); *G06F 16/256* (2019.01)

(58) Field of Classification Search
CPC ... G06F 16/214; G06F 16/2453; G06F 16/254
See application file for complete search history.

(56) References Cited

U.S. PATENT DOCUMENTS

2010/0332401 A1*  12/2010  Prahlad ............... H04L 63/0428
                                                        705/80
2014/0136688 A1*  5/2014  Kopri .................. H04L 43/0858
                                                        709/224

OTHER PUBLICATIONS

Agnew William et al., "An ensemble-Based Recommendation Engine for Scientific Data Transfers", 2016 7th International Workshop on Data-Intensive Computing in the Clouds (Datacloud), IEEE Nov. 14, 2016, pp. 9-16.

* cited by examiner

*Primary Examiner* — Loc Tran
(74) *Attorney, Agent, or Firm* — Mannava & Kang, P.C.

(57) ABSTRACT

Examples of systems and method for data transition are described. In an example, the present disclosure provides for automating the process of data movement from on premise to cloud, i.e., source Data warehouse (DWH) movement, ETL to cloud base DWH, ETL. The present disclosure provides for objects identification, metadata extraction, automated data type mapping, target data definition script creation, data extraction in bulk using source native optimized utilities, users and access control mapping to the target DWH, binary object movement, end-end audit report, and reconciliation reports.

20 Claims, 26 Drawing Sheets

3. SCHEMA GENERATION AND DATA LOADING

SMART DATA MOVER
ENABLING AUTOMATED MOVEMENT OF DATA TO CLOUD

| CONNECTION | DISCOVERY | TRANSPORT | RECONCILIATION |
|---|---|---|---|

TABLE SUMMARY

SOURCE: TERADATA | TARGET: AWS | SCHEMA/DB NAME: TPCH_DB

| SELECT | DB NAME | TABLE NAME | TABLE SIZE | TARGET | USAGE | MIGRATION STATUS |
|---|---|---|---|---|---|---|
| ☐ | TPCH_DB | AGG_FT_LINETERM | 0.0547 | REDSHIFT ▾ | ○ HOT | - |
| ☐ | TPCH_DB | CUSTOMER | 51.4766 | REDSHIFT ▾ | ○ HOT | - |
| ☐ | TPCH_DB | CUSTOMER_ADDRESS | 2813.5938 | REDSHIFT ▾ | ○ HOT | - |
| ☐ | TPCH_DB | CUSTOMER_ADDRESS_TEXT | 0.3594 | REDSHIFT ▾ | ○ HOT | - |
| ☐ | TPCH_DB | FALLBACK_TEST | 0.0234 | REDSHIFT ▾ | ○ HOT | - |
| ☐ | TPCH_DB | FDR_MASTERFILE | 0.0938 | REDSHIFT ▾ | ○ HOT | - |
| ☐ | TPCH_DB | IDEN_TEST | 0.0234 | REDSHIFT ▾ | ○ HOT | - |
| ☐ | TPCH_DB | INDIAN_SALES | 0.0234 | REDSHIFT ▾ | ○ HOT | - |
| ☐ | TPCH_DB | INVENTORY | 34645.4961 | REDSHIFT ▾ | ○ HOT | - |
| ☐ | TPCH_DB | INVENTORY_B | 34556.125 | REDSHIFT ▾ | ● COLD | - |

1 TO 10 OF 34   PAGE 1 OF 4

SELECT TYPE OF MIGRATION: ● DATA + SCHEMA  ○ DATA ONLY  ○ SCHEMA ONLY  ○ SAMPLE DATA + SCHEMA

[MIGRATE] [EXPORT]

- CONFIGURATION
- INITIATE MOVEMENT
- UTILITIES

Figure 7C

SMART DATA TRANSITION TO CLOUD

PRIORITY CLAIM

This application claims priority from Indian provisional application number 201811044050 filed on Nov. 22, 2018, the disclosure of which is incorporated by reference in its entirety.

BACKGROUND

Data transition typically includes transferring large amounts of data from any source data lake/data warehouse/database, such as, for example, a source database or a legacy database, to another data lake/data warehouse/database on to a Cloud-based environment, referred to as the target.

There may be various reasons for migrating data to a cloud-based environment. Generally, data migration to the cloud is planned considering the increasing volume, variety and velocity of data in the on-premise environment. Alternatively, the data migration is performed when organizations may change or upgrade their systems. In another circumstance, a data warehouse may be frozen and monolithic, which may require unfreezing the data warehouse and moving a few of its components to a data lake and the other components to a data warehouse. Generally, the data to be migrated is extracted from the source, modified based on the format and style of the target, and loaded to the target cloud environment to give the ability to match the type of data with the best service on cloud.

Migrating data from an on-premise environment to the cloud involves more than a mere lift and shift of the data. Indeed, migrating data to the cloud requires features such as, for example, speed of movement between the on-premise environment and the cloud environment, automated schema discovery/detection, identifying repeatable processes, performing SQL conversion, and reconciling data. Such features lend to an efficient and effective movement of data from one system to another.

In many instances, the data to be migrated from the source data location to the target location on cloud may be provided in an unstructured format or a format that is different from what can be understood by the target cloud database or a target cloud warehouse or/and cloud storage. The unstructured data may need to be stored in an organized manner in the target data warehouse so that various migration related operations such as queries, reporting, and other data analysis functions, can be performed on the data.

Various techniques may be used for data migration. For instance, data migration may be performed using Extract, Transform and Load (ETL) transformations or operations. ETL operations may be used in a data warehouse that may provide data reporting and other data analysis functionality using a database.

ETL operations can facilitate the loading of the data from multiple different data sources into the target data warehouse/data lake by transforming and cleansing the data prior to the loading. The transformation may include formatting the data from the data sources to a format that is usable by the target data warehouse. For instance, the data may be required to be moved to a cloud-based warehouse. Such data movement may require attributes such as, for example, objects identification, metadata extraction, data type mapping, target data definition, target specific sql conversions and script creation. The data movement may also require data extraction in bulk using source native optimized utilities, users and access control mapping to a target data warehouse, i.e., the cloud-based data warehouse, binary object movement, end-end audit report, and reconciliation reports. The cloud-based warehouse may also include database objects that may be unsupported by the source database.

In addition, a schema representing a structure and a relation of data stored in the tables of the source database may be created for migration based on parameters, such as dimensions of tables, and a relation between the tables within the cloud-based warehouse. The schema may be compatible with the cloud-based warehouse. Creating the schema is often complex for the cloud-based warehouse with unsupported database objects. Additionally, complexity may increase in cases where an on-premise ETL is converted to a cloud based ETL, which may require transformations within multiple fields. When performed manually, this process of creating source tables in the target data warehouse, the schema, and converting from the on-premise ETL to the cloud based ETL may require assessing a large number of parameters, and the scripting and validation of such parameters. This process is time-consuming, effort intensive, and may be prone to errors.

The present disclosure provides a technical solution to a problem of performing efficient data migration, for instance, in cloud based environment.

BRIEF DESCRIPTION OF THE DRAWINGS

Features of the present disclosure are illustrated by way of examples shown in the following figures. In the following figures, like numerals indicate like elements, in which:

FIGS. 7a-7d schematically illustrate various stages in a data transition lifecycle, according to an example embodiment of the present disclosure;

DETAILED DESCRIPTION

Figure 1:
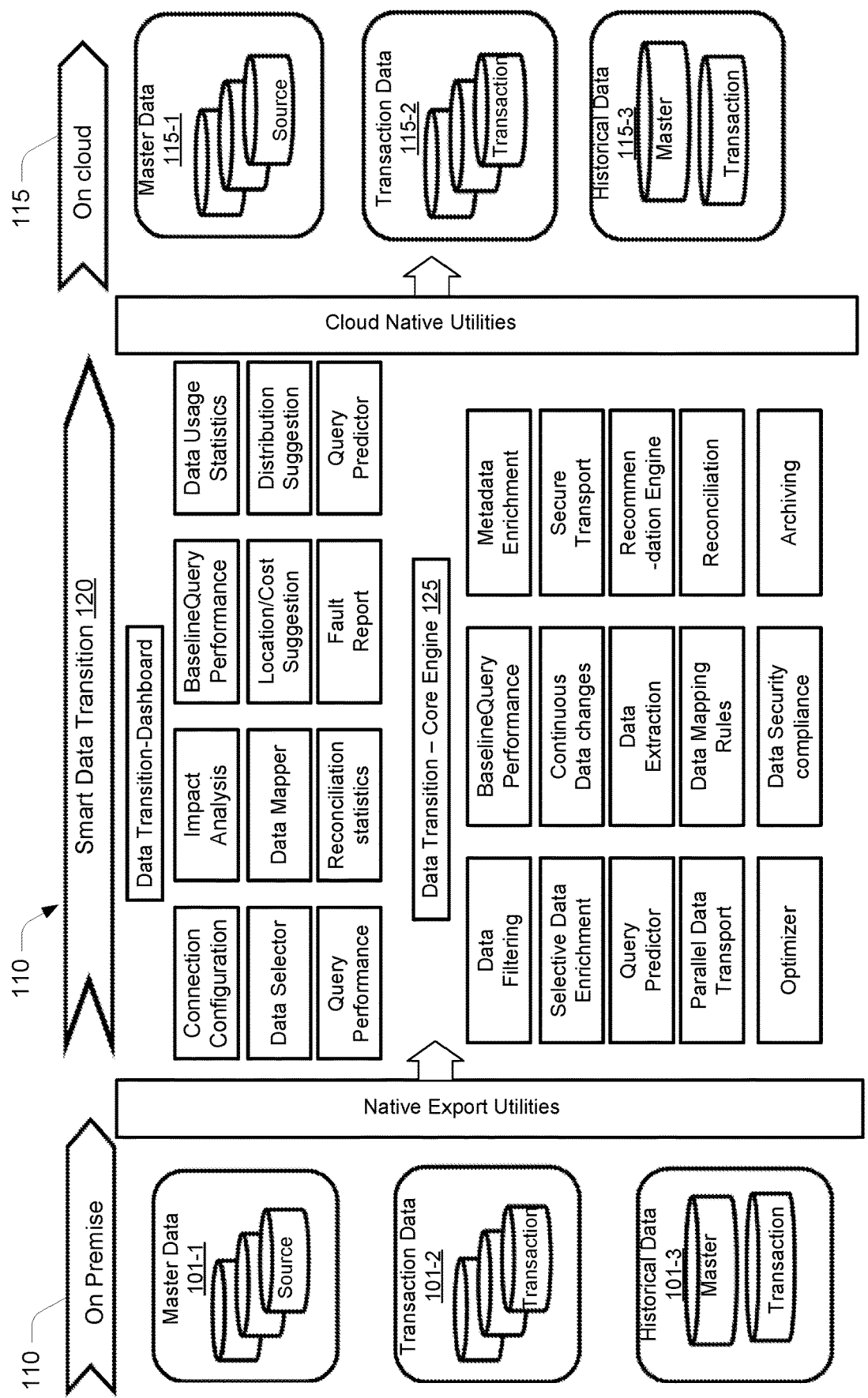
FIG. 1 illustrates an architecture for data transition, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on, the term "based upon" means based at least in part upon, and the term "such as" means such as but not limited to.

The present disclosure describes a method and a system related to data migration from a data warehouse or a legacy database or a data lake to any target data warehouse/data lake, such as a cloud-based data warehouse/data lake on cloud. In an example embodiment, migrating data from a legacy data source to a target data warehouse/data lake comprises of predicting a location in the target cloud environment based on the data of the legacy database. The method also includes determining the amount of data to be migrated from the legacy data source to the target cloud and selecting the location in the target cloud. The location may be selected, for instance, based on the query usage patterns to determine hot/warm/cold data in the source.

After selecting the location in the target cloud environment, query performance in the cloud based data warehouse may be predicted without actual movement to the cloud. The query performance may aid in determining details pertaining to execution of the query on the target cloud data warehouse. Such details may include, for instance, execution time of the query and data retrieved in response to the query.

In an example, to intelligently perform data migration, historical data may be used to train models. A model may be generated based on data and metadata corresponding to classified tables. The model may be trained against a decision support benchmark, for example, a Transaction Processing Perfromance TPCH Benchmark™, which comes with various data set sizes to test different scaling factors.

The models may be trained for examining large volumes of data, executing complex queries including multiple joins and complex analytical functions, and responding to critical questions in the target data warehouse. Thereafter, data values may be provided based on the historical data of past migration of the cloud. The data values may refer to client environment data based on which the models may be retrained during deployment in a client environment. After providing the data values, incorrect and sensitive data, for example, a credit card number may be identified and obfuscated. Additionally, incorrect characters, such as control m characters and null characters may be rejected. The present disclosure also provides for Structured Query Language (SQL) transformations from a source data warehouse to a target data warehouse in the cloud environment in an efficient manner as the syntax of the SQL may vary.

The present disclosure intelligently automates the process of converting and moving an on-premise Extract Transform Load transformations to a cloud based ETL tool, such as AWS Glue, PySpark, Scala, and Matillion, and a source data warehouse (DWH) movement to a cloud based data warehouse. The conversion of the on-premise ETL to a cloud based ETL tool facilitates in leveraging cloud specific features, such as on demand compute to spin up a server when an ETL job is to be executed. The conversion to the cloud based ETL tool also prevents vendor locking and high Total Cost of Ownership (TCO) of using an on premise ETL tool. The present disclosure also provides for the automation of the objects identification, metadata extraction, automated data type mapping, and target data definition script creation. Further, the disclosure provides for data extraction in bulk using source native optimized utilities, user and access control mapping to the target DWH, binary object movement, end-to-end audit report, and reconciliation reports. In an example embodiment, the on premise ETL tool may be converted to an intermediate form such as, for example, xml, and then converted to a cloud based ETL tool such as AWS Glue, PySpark, Scala, and Matillion.

The present disclosure efficiently automates the process of migrating data and reduces efforts of creating scripts for tables to be moved. For instance, the present disclosure provides for savings in manual efforts as part of the end-to-end data movement. The disclosure provides for smooth migration from one data warehouse to another by automating data type mapping and object compatibility mapping between the data warehouses. The present disclosure supports a variety of source data warehouses, such as, for example, Teradata, Oracle, Netezza, IBM DB2, Cloudera; and a variety of target data warehouses, such as, for example, Snowflake on AWS, Snowflake on Azure, Amazon Redshift, AWS S3, AWS EMR, Google Big Query, and Google Cloud DataProc.

FIG. 1 illustrates an example architecture 100 for data transition 105 from a source database or an on-premise data source 110 to a target data warehouse 115, according to an example of the present disclosure. The architecture 100 provides a high-level view of a system for data transition/migration. The architecture is configured such that individual components in the architecture 100 may work independently and may be reusable for feature extension during data migration. Each subsystem or component may be decoupled from each other so that development can be done in parallel with different developer. The architecture 100 may build on OOD as base with factory pattern.

The on-premise data source 110 includes master data 110-1, transaction data 110-2, and historical data 110-3, which may include historical data pertaining to the master data 105-1 and the transaction data 105-2. The on cloud target DWH 115 may include corresponding master data 115-1, transaction data 115-2, and historical data 115-3.

The architecture 100 is configured in such a way so that a corresponding system can be executed from UI such as a dashboard 120, as well as from an interactive shell, such as a core engine 125. The data transition 105 may include a dashboard 120, which may be visible to users and a core engine 125, which may be perform core ETL operations for data transition. The dashboard 120 may include connection configuration, impact analysis, business query performance, data usage statistics, data selector, data mapper, location/cost suggestion, distribution suggestion, query execution performance, reconciliation statistics, fault report, and query execution predictor. The core engine 125 includes data filtering, cloud connectors, metadata enrichment, selective data enrichment, continuous data changes, secure transport, reconciliation, archiving, data extraction, data mapping, recommendation engine, query execution predictor, parallel data transport, optimizer, and data security and compliance.

The architecture 100, among other things, also illustrates a Machine Learning ("ML")-based recommendation engine, which may include a cloud location recommender, a data identifier, and a predictor. The cloud location recommender may predict the location in the selected cloud environment based on the data and variables such as data usage for number of queries fired against a table, frequency of usage of the table by business users. The variables may also include a volume of data when the volume of data is low, and if there is a table, which can be accessed by referential key only, other impacted variables and a recommended location on the cloud. The data identifier may identify data values based on the historical data collected from the past migrations. The data identifier may also identify bad and sensitive data, and perform selective obfuscation through discovery of such data. The data identifier may also map compatibility between objects of the source database or the on-premise data source 110 and the target data warehouse 115.

The predictor may predict query performance and Structured Query Language (SQL) function. The query performance may be predicted prior to migration of data to the cloud environment to ensure distribution styles are recommended. A distribution style refers to how the data is being distributed across servers in a data warehouse. For instance, a distribution style may include distributing all copies of the data across the servers and another distribution style may include distributing copies of only selected data. The distribution style may also be applicable at a table level for each table in a cluster, for distributing the data within the table of the data warehouse. The query performance may include features, such as source database execution time to predict dependent variables, source database specific variables, volume of data, independent variable, available memory, number of joins, number of nested queries, rolling joins, advanced analytical functions, referential key usage, time frame, query for varying per client data warehouse, target database execution time, other target database specific variables. The dependent variables may include variables that directly impact performance of a query, such as, the number of joins on tables, as with higher number of joins, the query takes longer to execute.

In an example, the connection configuration may provide activity connection information as a part of an administrative activity. The activity connection information may be used by a system during data movement process. The impact analysis may determine database tables and how much dependencies the database tables have on other objects, and an impact of these dependencies on data movement process. The business query performance may determine queries that may be utilized for business reporting, and may determine query performance of the queries by running the queries on the target cloud and provide performance metrics. The data usage statistics, the data selector, the data mapper and the location/cost suggestion may be used as a part of data discovery for determining usage frequency of database objects and determining a cloud storage that may be appropriate based on performance and cost. The distribution suggestion may be used for analyzing the relation between the database tables and suggest a most suitable distribution style for the tables to have best performance.

The query execution performance may be utilized for executing a sample application query on the target data warehouse to check performance of the cloud data warehouse after movement of the data. The reconciliation statistics may be to indicate that a validation run on each object assures all data is moved as expected. In an example, the reconciliation statistics may include information regarding database migration objects for content and row counts in a source table in the source database 110 and a migrated table in the cloud environment. In an example, the source table may store the data to be migrated to the cloud environment and the migrated table may be a table that is migrated from the source database to the cloud environment. The fault report includes issues with movement of any selected object. The query execution predictor may be a tool having intelligence to determine performance of an on-premise query with a given cluster and data setup in production. The query execution predictor may track the performance on a TPCH data set and predict real query behavior after the movement of data. The data filtering may provide for filtering out few columns and rows of the database tables by providing a configuration upon a requirement of a client. The cloud connectors facilitate in extending the system to any cloud platform having connectors for Azure, Amazon Web Services (AWS) and Google.

In an example, the data of the tables may be classified as one of hot data, cold data and warm data. The classification may be based on query usage. This may be tested with the Random Forest or XGB or Decision tree. Additionally, data preparation may be performed to build a dataset to train the model. A client specific dataset may not be available initially for the training and, therefore, the TPCH data set may be divided in a 80-20 ratio, where 80% of the data set may be used to train the model and 20% to test the model after the training. The model may be trained with the TPCH DB and the default queries may be provided. The model may be validated on the F1-score along with the accuracy and null accuracy. The TPCH database is a decision support benchmark and includes a suite of business-oriented ad-hoc queries and concurrent data modifications. The queries and the data populating the database are selected to have broad industry-wide relevance. This benchmark illustrates decision support systems that may examine large volumes of data, execute queries with a high degree of complexity, and provide answers to critical business questions. The performance metric reported by TPCH Benchmark™ may be referred to as TPCH Composite Query-per-Hour Performance Metric (QphH@Size), and reflects multiple aspects of the capability of the system to process queries. These aspects include a selected database size against which the queries are executed, the query processing power when queries are submitted by a single stream, and the query throughput when queries are submitted by multiple concurrent users.

The TPCH database may be used to enable automation powered by Machine Learning. Further, a system for data migration described herein has a configurable design and for any source data warehouse/ETL source, a configuration file may be needed to be included ensuring minimum code changes. In an example, various technologies, such as, python scripting, shell scripting, and cloud utilities for cloud integration may be used.

For example, the source DB
Query X–2 secs
# of Joins–1
Target DB
Execution time in Redshift is 1 sec, and in BigQuery is 4 sec
The query performs better in Redshift.

In an example, this may be identified as a regression problem. A model may be built using Linear Regression or Random Forest Regression algorithms. Features, which represent both, query structure and the source and target data warehouse environment may be created. Further, the source and target data warehouse may be prepared by running the features on the TPCH queries on the different target data warehouse. Additionally, feature selection may be used to check for outliers and identify the impacting features. Further, there may be validation of the model, Mean Absolute Error (MAE), other metrics like coefficient of determination (R2) that is indicative of a cause of extent of variability of a factor based on relationship of the factor with another factor, Root Mean Square Error (RMSE) and the model may be fine tuned using grid search, and SQL function prediction.

In an example, SQL transformations from the source data warehouse to the target cloud data warehouse may be performed intelligently as the syntax of the SQL may vary. For example, in Teradata, this may be: where my_date_datatype >'2017-01-01'. In Snowflake, this may be: where my_date_datatype >cast('2017-01-01' as date). For transformation, the SQL query may be broken into tokens and a dictionary with SQL Functions mapping between the source and target data warehouse may be created. Further, all SQL queries embedded in ETL or Source scripts may be fetched, and segmented into tokens and used in a Decision Tree Algorithm to replace the parts of the SQL that vary. The SQL queries may be fetched and parsed, and then tokenized to associate the SQL queries with different tokens. For example, the SQL queries may be associated with the tokens, keywords, Builtin, and identifier. The keywords token may refer to select, join and insert in the SQL queries, the Builtin may correspond to character and binary of the SQL queries and the identifier may include column names of the database tables. The tokens aid in efficiently converting the SQL queries to target specific standards. Thereafter, depending on type of the token, corresponding actions may be performed. Additionally, in an example, the model may be trained with the 22 Queries provided in TPCH DB and test data to be enhanced further.

The details pertaining to various other components and data transition is described in following figures.

Figure 2A:
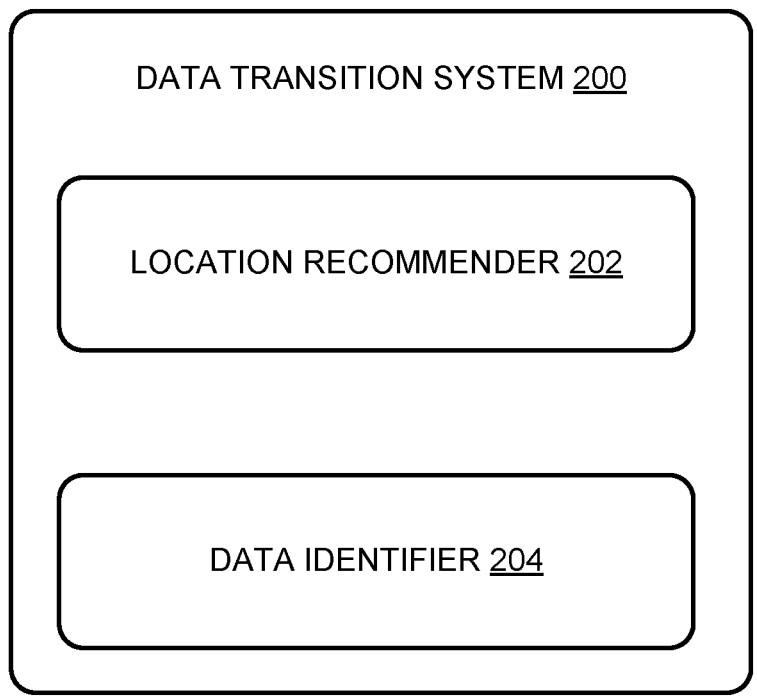
FIG. 2a illustrates a block diagram representation of a data transition system, according to an example embodiment of the present disclosure.

FIG. 2a illustrates the various components of the data transition system 200 for migrating data, according to an example implementation of the present disclosure. The system 200 comprises a location recommender 202 and a data identifier 204.

The location recommender 202 may predict a location in a cloud environment based on corpus of data from the TPCH database. The corpus of data may be predefined as a column in a training data set. The location recommender 202 may also predict query performance of the cloud environment. The query performance may be predicted based on the historical data. For example when the query is executed against the TPCH database, the query may have a certain performance. The query may be executed against the TPCH database on the cloud data warehouse and the performance of the query may be captured. The performance of the query may be used to train the model. Once new queries are tested against the model, the performance is predicted based on the trained model using an algorithm, such as linear regression. The data identifier 204 may prompt data values based on historical data of past migrations of the cloud. The historical data may train models for examining large volumes of data. The models may also be used to execute complex queries and responding to critical questions.

Further, the data identifier 204 may identify the incorrect and sensitive data and obfuscate the incorrect and sensitive data. In an example, the data identifier 204 may identify the incorrect and sensitive data based on a configured sensitive data format. The model may be trained to identify similar incorrect and sensitive data from free form text based on a training data set. Further, the data identifier 204 may identify columns, for example, comments free text. NLP based text classification will be used and Naïve Bayes algorithm may be used to classify where the data value has sensitive content, and may run regex in order to identify the sensitive data patterns.

Figure 2B:
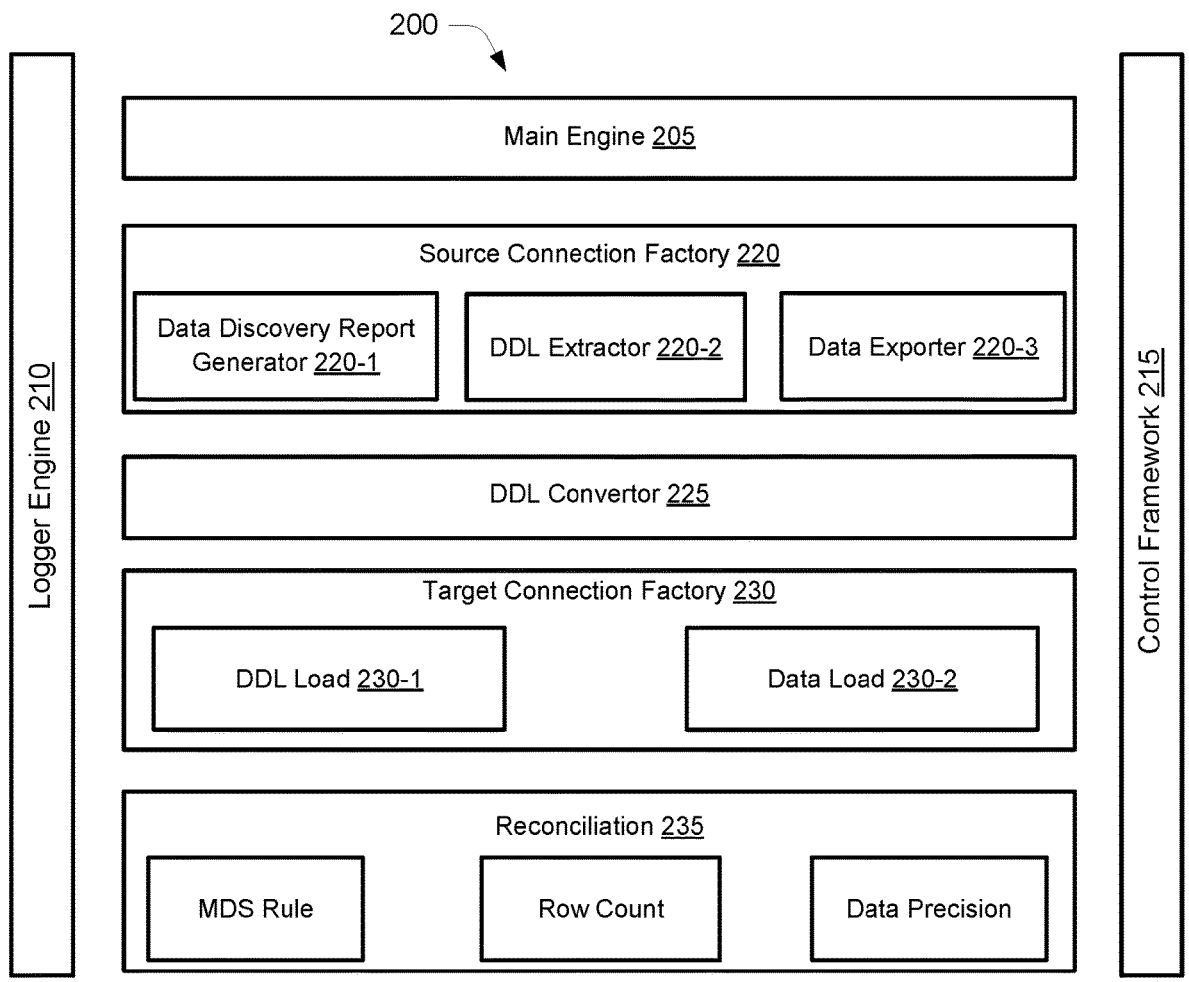
FIGS. 2b-2f illustrate the structure of various components of the data transition system, according to an example embodiment of the present disclosure.

FIG. 2b illustrates a block diagram representation of additional components of the system 200 for migrating data from the source data warehouse to the target data warehouse, according to an example implementation of the present disclosure. The system 200 includes, among other components, a main engine 205, a logger engine 210, a control framework 215, a source connection factory 220, a DDL convertor 225, a target connection factory 230, and a reconciliator 235. In an example, components of the system 200 are designed with different programming languages, which may be based on python and shell scripting.

The different components of the system 200 may be configured based on their respective responsibilities. Each component may include multiple sub-components. In an example, each sub-component in the system 200 may be configured using Object Oriented Design (OOD) so that the sub-components/components can be reusable, easy to maintain and debug. Each sub-component may again be divided in one or more modules. The modules may be categorized base on the responsibility of work.

In an example, the main engine 205 may be an entry point for the system 200. An application may be executed through interactive shell, where the main engine 205 may request a user to choose an option based on which process should be executed. For example, when the user interacts with the main engine 205, the main engine 205 may request for an option for a source, such as Teradata (T), Oracle (O), Netezza (N). After selecting the source, the main engine 205 may prompt the user to provide an input for schema movement with or without constraints or for a data movement. The main engine 205 may also prompt the user to provide the target data warehouse for movement, such as Bigquery (B), Redshift (R) or Snowflake (S). The main engine 205 may also be executed by passing appropriate parameters, when executed from a corresponding User Interface (UI). The main engine 205 may also be executed through the a UI mode, where the user may select the source and target option from the UI. After selecting the source and the target, the movement of the data may be triggered by providing an input, such as clicking a transport button on the UI. The application class may redirect appropriate subsystem based on the user input provided during runtime or parameter passed by the UI.

The logger engine 210, in an example, may be a python-based logger module. The logger engine 210 may log different levels of operation details to control an internal database as well as a local file system. The internal database log details pertaining to various steps to help understand status of process and helps in debugging any exception failure in the client environment to quickly provide a fix and return the process for the failed object. The logger engine 210 is implemented based on the logging library of python. A logger class inherits from the python logging class. Further, internally the logger engine 210 may be working in a separate thread so that log operation does not block main operation or thread from where log initiated.

Figure 2C:
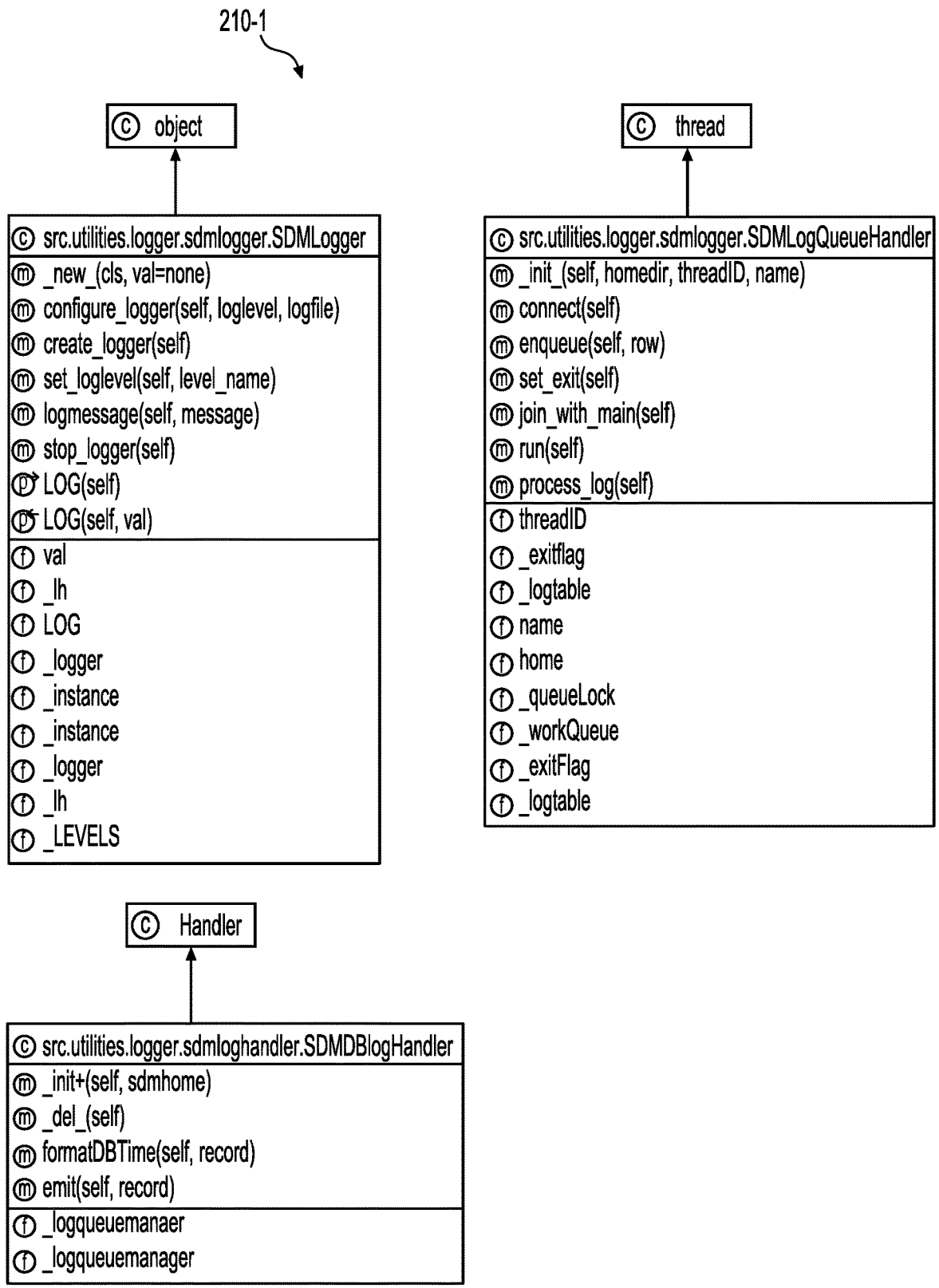

A multithreaded queue-based approach may be employed for implementing the logger engine 210. The log information may be stored in queue and a separate thread monitors the queue and log to a database. The logger engine 210 can be configured to different levels based on the need. For instance, the logger engine 210 may either log details of each and every information processed or information related to only errors. By default, the logger may start with information level, where different log levels are errors, info, debug, and none. An output 210-1 of the logger engine 210 is illustrated in FIG. 2c.

In an example, a control framework 215 may be a main hold different component. The control framework 215 may provide a generic framework to monitor the different task/operation status and may also provide data type mapping details for DDL conversion from source to target. The control framework 215 may also store the logging details to track the operation sequence and for debugging when needed.

Underneath the control framework 215 may be any database. The control framework 215 may connect different databases to retrieve the information or for storing the information. Therefore, during different phases of the system 200, different databases may be connected for retrieving the information. For instance, MYSQL, SQLITE, ORACLE, POSTGRESQL, or SQLSERVER, may be used as control database. To implement the control frame work python based no SQL module 'SQLALCHEM' library may be used.

The source connection factory 220 may include all supported source connection components. The configuration of the source connection factory 220 may be based on the factory pattern, so the factory class return the connection object base on the source selection. Thus, any other subsystem or component may use this source connection factory 220 to complete the source specific operation. In an example, each source specific connection class may use different python package to establish the connection. In an example, the system 200 supports multiple sources, such as, for example, Netezza, Teradata, and Oracle.

In an example, for Netezza, the 'SDMNetezzaConnection' class is configured for database connection and the class may use "pyodbc" python module to establish the connection in top of the Netezza odbc driver.

In another example, for Teradata, the 'SDMTeradataConnection' class may be implemented, which will perform necessary steps to connect with a Teradata server. The class uses "teradata" python module to establish the connection with Teradata on top of Teradata odbc driver.

Likewise, for Oracle, the 'SDMOracleConnection' class implements to connect with an oracle server. The class uses "cx_oracle" python package to establish the connection with oracle database.

To make connection, source specific configuration may need to be configured. The configuration file should be present in the application configure data discovery report generation folder. Each connection object may have the session property, through which SQL script may be executed by other component of the application.

Figure 2D:
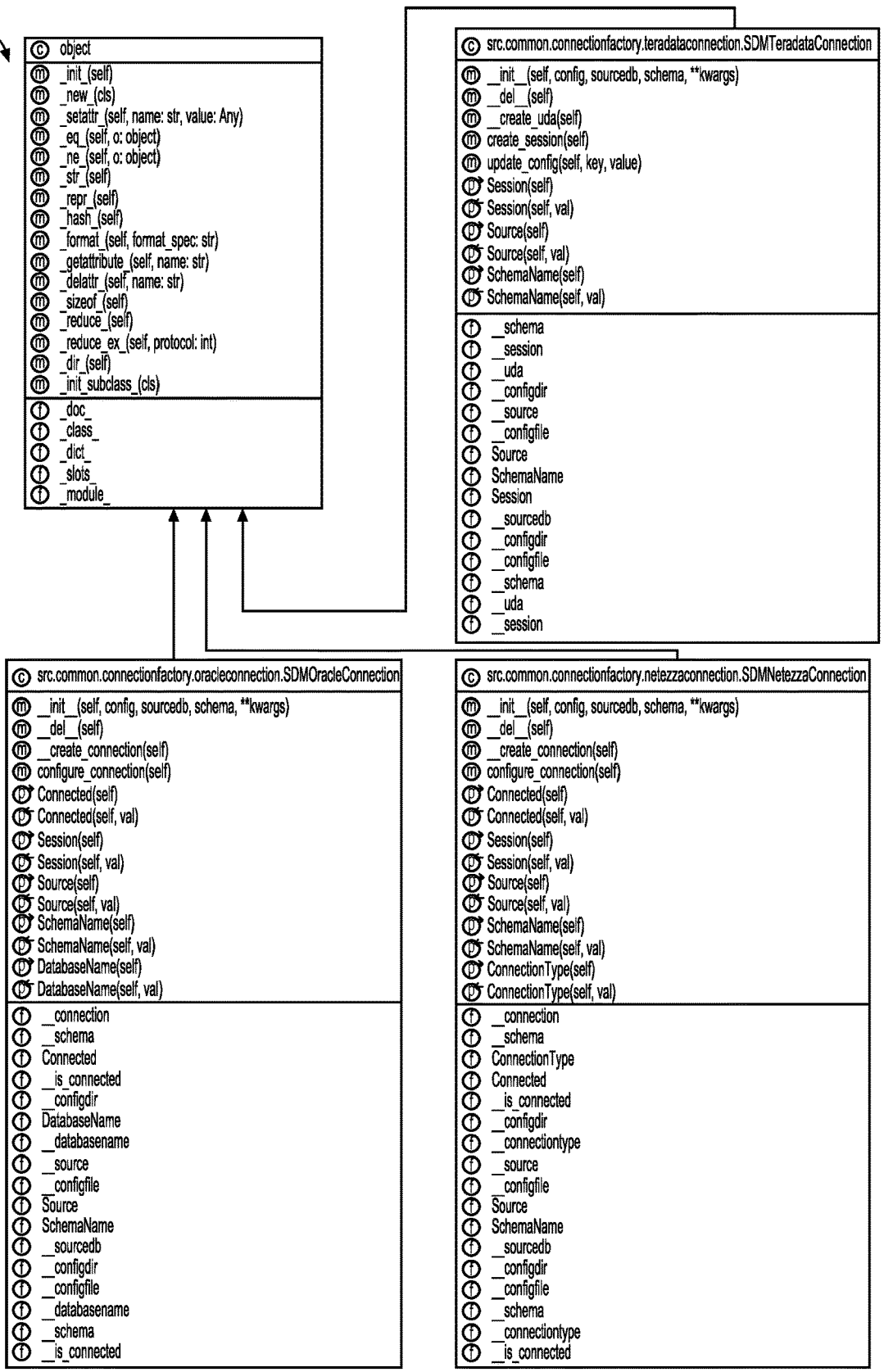

The source connection factory 220 may include following sub components, such as a data discovery report generator 220-1 also referred to as the report generator 220-1, a DDL extractor 220-2, and a data exporter 220-3. Components along with the reconciliator 235 may inherit the connection class. An example structure 220-4 of the source connection factory 220 is illustrated in FIG. 2d.

Figure 2E:
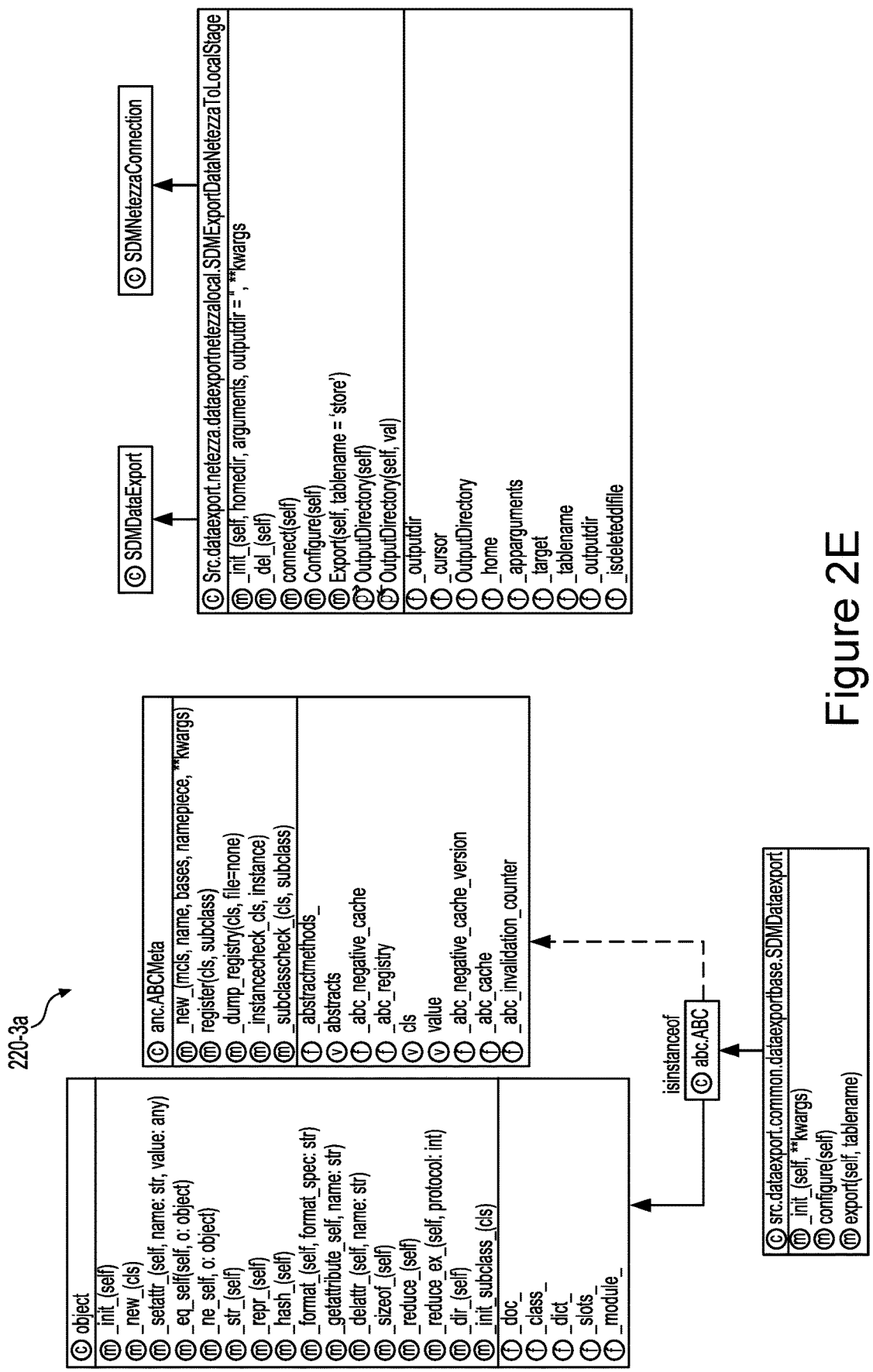

The data exporter 220-3 may have source specific data export module. Each module may connect to the source and export the table data to the local file system. The module may implement the abstract base class "SDMDataExport" inherited from source connection class from source connection factory. An example structure of data exporter 220-3a is illustrated in FIG. 2e.

In an example, for Netezza, "SDMExportDataNetezzaToLocalStage" class may be used to export the data from Netezza source.

The class may be derived from "SDMDataExport" and "SDMNetezzaConnection" class. "SDMDataExport" may be the abstract class, which may be used provide the interface for the data export. "SDMNetezzaConnection" may be a base class that provides the source specific connection details and may be used to connect to the source database. The data export may be done through an Open Database Connectivity (ODBC) driver with Netezza external table. Likewise, similar principles may be valid for Teradata and Oracle.

Figure 3:
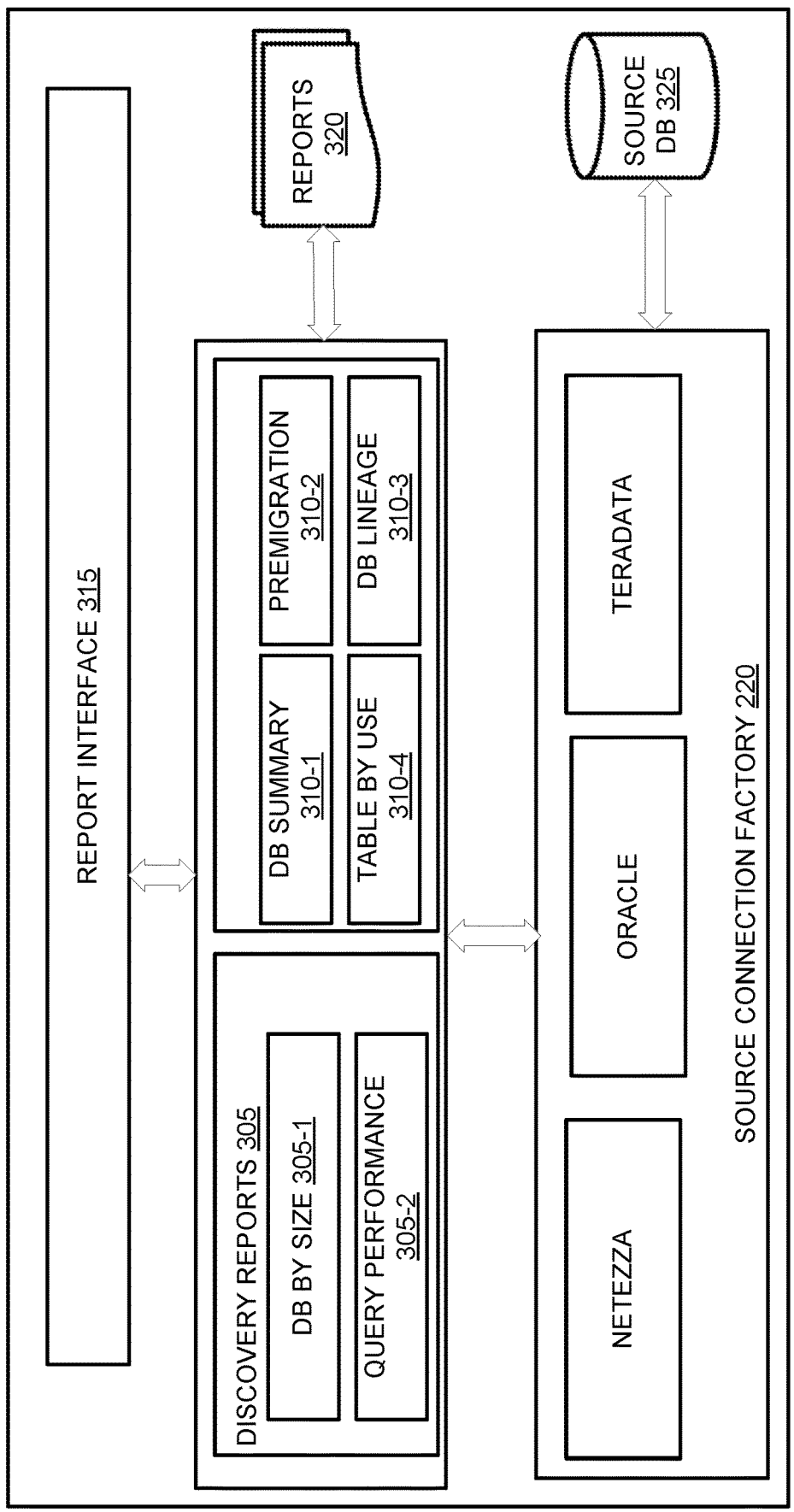
FIG. 3 illustrates a data discovery report generator of the data transition system, according to an example embodiment of the present disclosure.

The details pertaining to the data discovery report generator 220-1 and the DDL extractor 220-2 are provided in FIG. 3 onwards.

The data convertor 225 may be a common component and independent of the source data warehouse. The data convertor 225 may receive an intermediate source DDL data frame and convert the frame to specified target DDL. The details pertaining to data convertor 225 are provided in FIG. 5.

The target connection factory 230 may include all the system supported target database connection components. The target database connection components are loosely coupled components, which may be extended to add any target component to the system without interfering with the source or any other existing target component. The target component may be added or removed anytime from the system as per need. The target connection factory 230 may return the connection object based on the demand by the data transition application. Generally, other data transition application components may inherit from this class to establish the connection with target database. The supported targets include, for instance, Bigquery, Redshift, and Snowflake.

For Bigquery, "SDMBigqueryDbConnection" class may be implemented to establish the connection with big query database. This class may use "google-cloud-bigquery" python package is used internally to create the connection.

For Redshift, "SDMRedshiftDbConnection" class may be implemented to establish the connection with big query database. This class may use "psycopg2-binary" python package is used internally to create the connection.

For Snowflake, "SDMSnowflakeDbConnection" class may be implemented to establish the connection with snowflake database. This class may use "snowflake-connector" python package is used internally to create the connection.

Figure 2F:
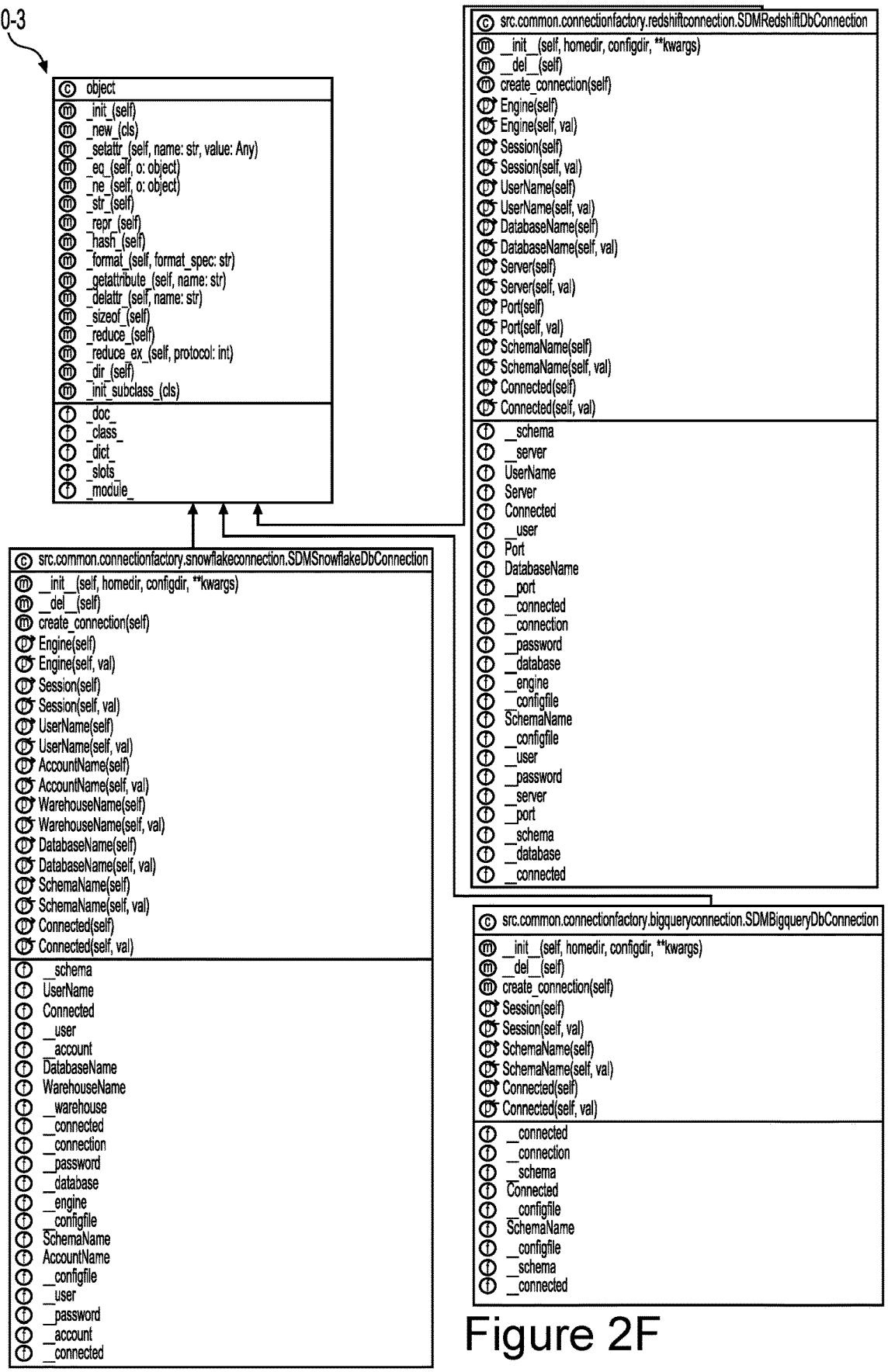

In an example, target specific configuration may need to be configured to make the connection. The configuration file may be present in the application configuration folder. Each connection object may be required to have a session property, through which SQL script may be executed by other component of the application. In an example, DDL Load/Apply 230-1, DDL Load/Apply 230-2, and reconciliator 235 may inherit the connection class. An example structure 230-3 of the target connection factory 230 is shown in FIG. 2f.

The reconciliator 235, in an example, may perform count reconciliation and key financial column reconciliation. The count reconciliation may include matching of row count from, for instance, Teradata to Snowflake. For example, the count reconciliation may be represented as:

Execute select count(*) queries for all tables in both Source and target

The key financial column reconciliation may include comparison of the summation of all key financial columns between Teradata and Snowflake. For example, key financial column reconciliation may be represented as:

Execute Sum of amount(Icl_amt) based on PERIOD_ID for 2 tables

Sum from Teradata (TEMP_F_CORE_INVC_DISC_SUM)

Sum from Snowflake (TEMP_F_CORE_INVC_DISC_SUM)

FIG. 3 illustrates a block diagram representation of the data discovery report generator, 220-1, according to an example implementation of the present disclosure. The report generator 220-1 may be configured to analyze the source database system. The report generator 220-1 include two key components discovery reports component 305, interchangeably referred to as delivery reports 305, and summary reports 310, interchangeably referred to as summary reports 310. Further, the report generator 220-1 may include a report interface 315 for interacting with the delivery reports 305 and the summary reports 310. The generated discovery reports may be stored in the reports 320.

The report generator 220-1 may generate audit reports based on a script, such as an SQL script of the source table in the soured database 110 and a target table in the cloud environment. In an example, the source table stores the data to be migrated and the target table receives the data. The report generator 220-1 may connect to the source to execute the predefined SQL script and store the result in the file with predefined format. The report generator 220-1 uses the source connection factory 220 in order to make the connection with the source database 325. For each source the report generator 220-1 has a corresponding module. The module may include source specific class and the source specific SQL script.

The delivery report 305 has a source specific module and each module may have an SQL script specific to the source to generate the reports. The source component must have to implement "SDMDiscoveryReportsCreator" class. This class may provide the basic structure of discovery report, which needs to be implement the child class. The delivery report 305 may create two reports, one based on database size as indicated at block 305-1 and another being based on query performance as indicated at block 305-2. The delivery report 305 may list down all the database with their size and may list down all the databases with their usage history.

For instance, for creating reports for Netezza, "SDMNetezzaDataDiscoveryReportsCreator" class may be used. The Netezza discovery report creator class may be inherited from SDMDiscoveryReportsCreator" and "SDMNetezzaConnection" class. Likewise, for creating reports for Teradata, "SDMTeradataDataDiscoveryReportsCreator" class may be used. The Teradata discovery report creator class may be inherited from "SDMDiscoveryReportsCreator" and "SDMTeradataConnection" class. Similarly, for creating reports for Oracle, "SDMOracleDataDiscoveryReportsCreator" class may be used. The Oracle discovery report creator class may be inherited from "SDMDiscoveryReportsCreator" and "SDMOracleConnection" class.

The summary report 310 has a source specific module and each module has SQL script specific to the source to generate the reports. Each module may have a script, such as an SQL script, specific to the source to generate the reports. The source component may have to implement "SDMReportsCreator" class. This class may provide the basic structure of summary report and act as base class, which may be needed to implement the child class. The summary report 310 may create database summary 310-1, table summary report 310-2, pre migration, table by usage 310-3 and DB lineage reports 310-4. The reports may be created individually or all at once.

For instance, for creating summary reports for Netezza, "SDMNetezzaReportsCreator" class may be used. The Netezza summary report creator class may be inherited from "SDMReportsCreator" and "SDMNetezzaConnection" class. Likewise, for creating summary reports for Teradata, "SDMTeradataReportsCreator" class may be used. The Teradata discovery report creator class may be inherited from "SDMReportsCreator" and "SDMTeradataConnection" class. Similarly, for creating summary reports for Oracle, "SDMOracleReportsCreator" class may be used. The Oracle discovery report creator class may be inherited from "SDMReportsCreator" and "SDMOracleConnection" class.

Figure 4:
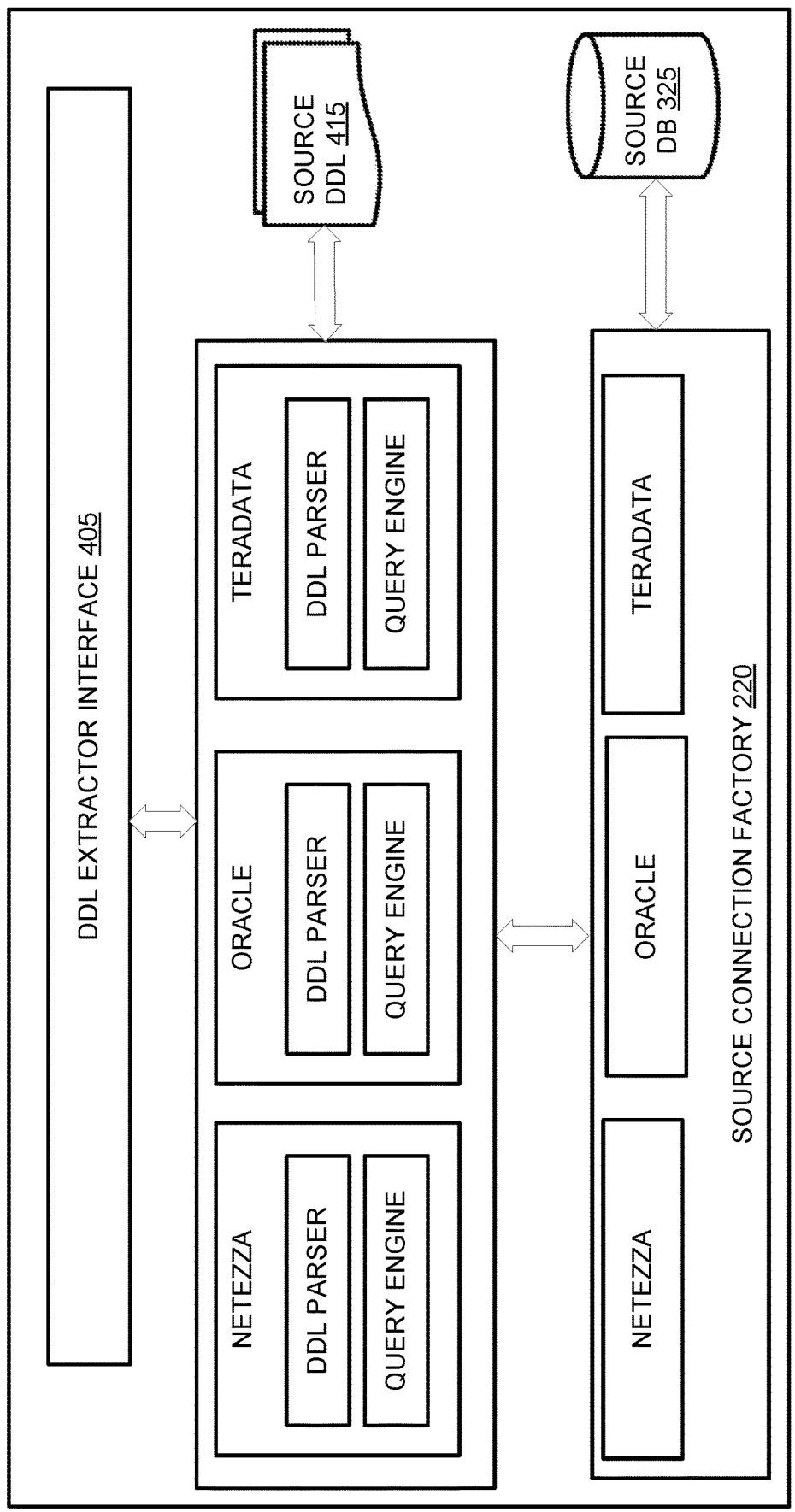
FIG. 4 illustrates a DDL extractor of the data transition system, according to an example embodiment of the present disclosure.

FIG. 4 illustrates a block diagram representation of the DDL extractor 220-2, according to an example implementation of the present disclosure. The DDL extractor 220-2 may include a DDL extractor interface 405 for communicating with a DDL creator factor 410, which in turn may be interacting with a source DDL 415 and the source connection factory 220.

In an example, the DDL extractor 220-2 may be source specific. Each source may have a pre-defined query, such as an SQL query, which may be executed by the DDL extractor 220-2 and stored in an intermediate data frame, such as panda. The data frame may then be used by a net module to convert it to target DDL. The intermediate data fare structure may be independent of the source. The DDL extractor class may implement two base class: one from the connection factory and other report base.

In an example, for Netezza, SDMNetezzaToTargetDDLCreator" class is used to extract the DDL for a table from source. The Netezza DDL extractor class may be inherited from "SDMDDLCreator" and "SDMNetezzaConnection" class. Further, Netezza DDL extractor SQL script may be executed and the result may be stored in the data frame. Further, there may be a configurable option to extract the key information.

For Teradata, "SDMTeradataToTargetDDLCreator", is used to extract the DDL for a table from source. "SDMTeradataToTargetDDLCreator" class may be used to create the summary reports for Teradata. The Teradata summary report creator class may be inherited from "SDMDDLCreator" and "SDMTeradataConnection" class. A example query for fetching the Teradata metadata is as, SELECT DISTINCT T.Tablename, C.columnname,
C.columnformat, C.columntype, C.columnlength, C.Nullable,
C.decimaltotaldigits,
C.decimalfractionaldigits, C.chartype, I.indextype, I.indexname
FROM dbc.tablesv T, dbc.COLUMNSv C LEFT OUTER JOIN
dbc.indices|ON C.columnname=I.columnname
WHERE T.Databasename=C.Databasename
AND T.Tablename=C.Tablename
AND T.Databasename='${dbname}'
AND T.Tablename='${tblname}'
ORDER BY C.Columnld Further, Teradata DDL extractor SQL script may be executed and the result may be stored in the data frame. Further, there may be a configurable option to extract the key information Likewise, for Oracle, "SDMOracleToTargetDDLCreator" class may be used to create the summary reports for Oracle. The Oracle summary report creator class may be inherited from "SDMDDLCreator" and "SDMOracleConnection" class. Further, Oracle DDL SQL script may be executed and the result may be stored in the data frame. Furthermore, there may be a configurable option to extract the key information. In an example, the algorithm may be used based on factory design pattern depending on the source selected, for instance, Teradata. The metadata information of the database may be fetched and specific DDL may be generated based on internal logic.

Figure 5:
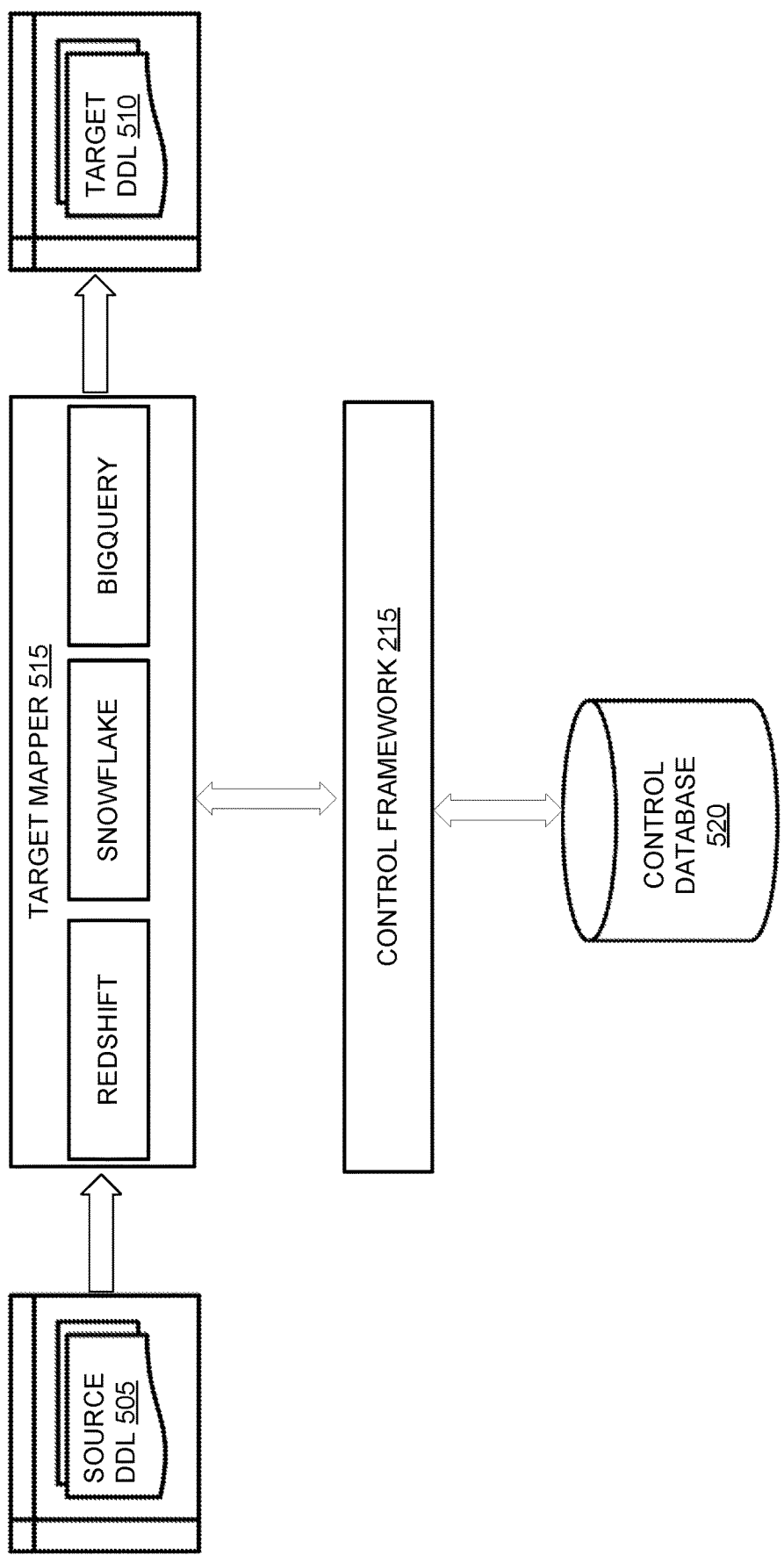
FIG. 5 illustrates a data convertor of the data transition system, according to an example embodiment of the present disclosure.

FIG. 5 illustrates a block diagram representation of the DDL convertor 225, according to an example implementation of the present disclosure. The DDL convertor 225 may be a common component and independent of source. The DDL convertor 225 may obtain the intermediate source DDL data frame, such as from source DDL 505 and convert the frame to a specified target DDL 510. To perform target mapping, the target mapper 515, the DDL convertor 225 may obtain the mapping information from a map table of a control database 520. The DDL convertor 225 may create an appropriate target mapper instance and map the source DDL data frame to target DDL.

For instance, for Bigquery, "SDMBigqueryTypeMapper" class may be used to create the DDL for bigquery from any source. This class may get the mapping information to source to bigquery from map table present in the control database 520. The DDL convertor 225 may fetch each column information from source DDL and map the data type to corresponding the bigquery data type. The DDI convertor 225 may also preserve the column length from source. The DDI convertor 225 may also create the json file for bigquery DDL.

Likewise, for Snowflake, "SDMSnowflakeTypeMapper" class may be used to create the DDL for snowflake from any source. This class may get the mapping information to source to snowflake from map table present in the control database 520. The DDL convertor 225 may fetch each column information from source DDL and map the data type to corresponding the snowflake data type. The DDL convertor 225 may also preserve the column length from source. Based on the user option this class may also preserve the source table key information during target DDL creation. Further, the DDL convertor 225 may create target DDL script.

Similarly, for Redshift "SDMRedshiftTypeMapper" class may be used to create the DDL for snowflake from any source. This class may get the mapping information to source to Redshift from map table present in the control database 520. The DDL convertor 225 may fetch each column information from source DDL and map the data type to corresponding the Redshift data type. The DDL convertor 225 may also preserve the column length from source. Based on the user option this class may also preserve the source table key information during target DDL creation. Further, the DDL convertor 225 may create target DDL script.

Figure 6:
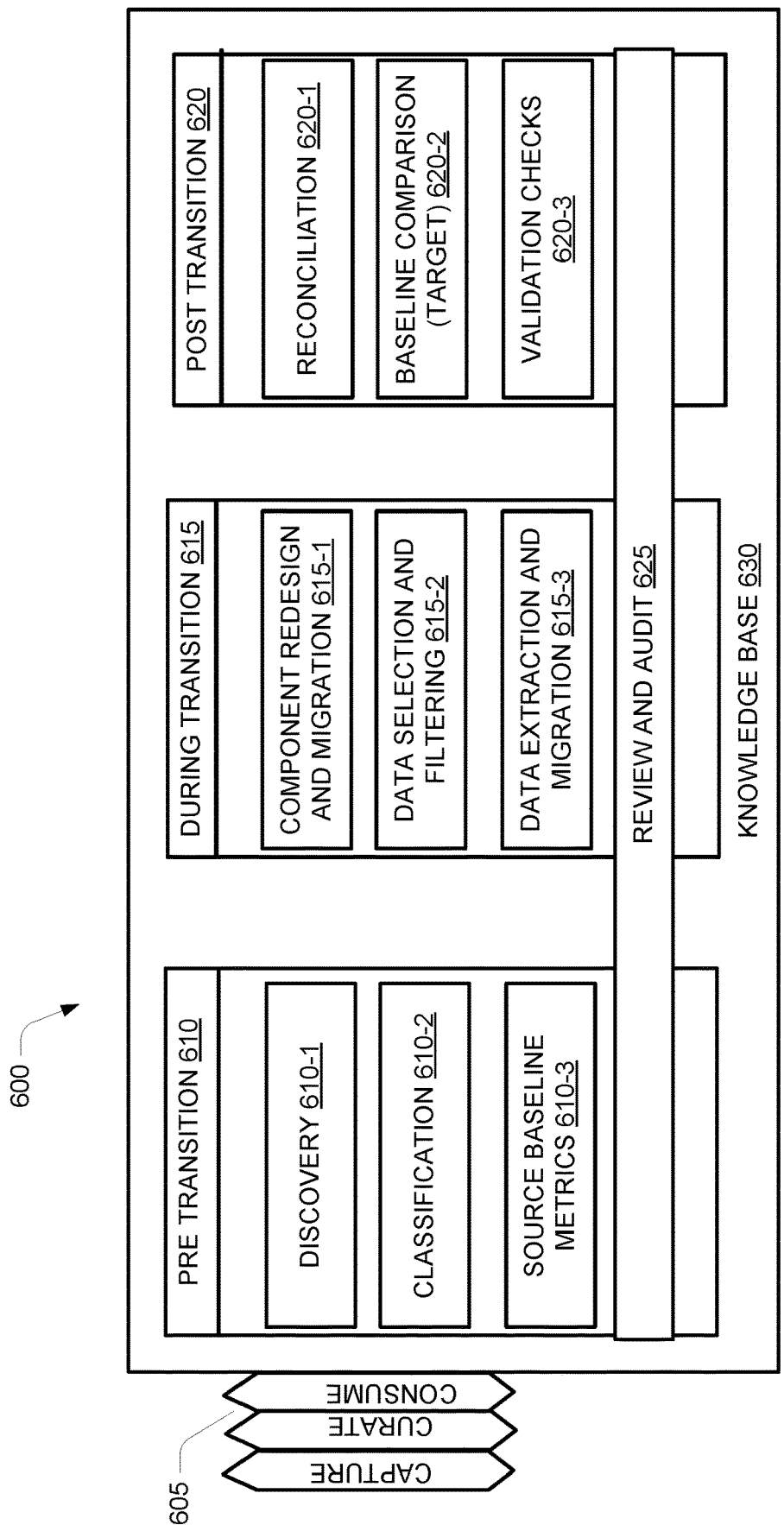
FIG. 6 illustrates a block diagram of an inspection system, according to an example embodiment of the present disclosure.
Figure 7A:
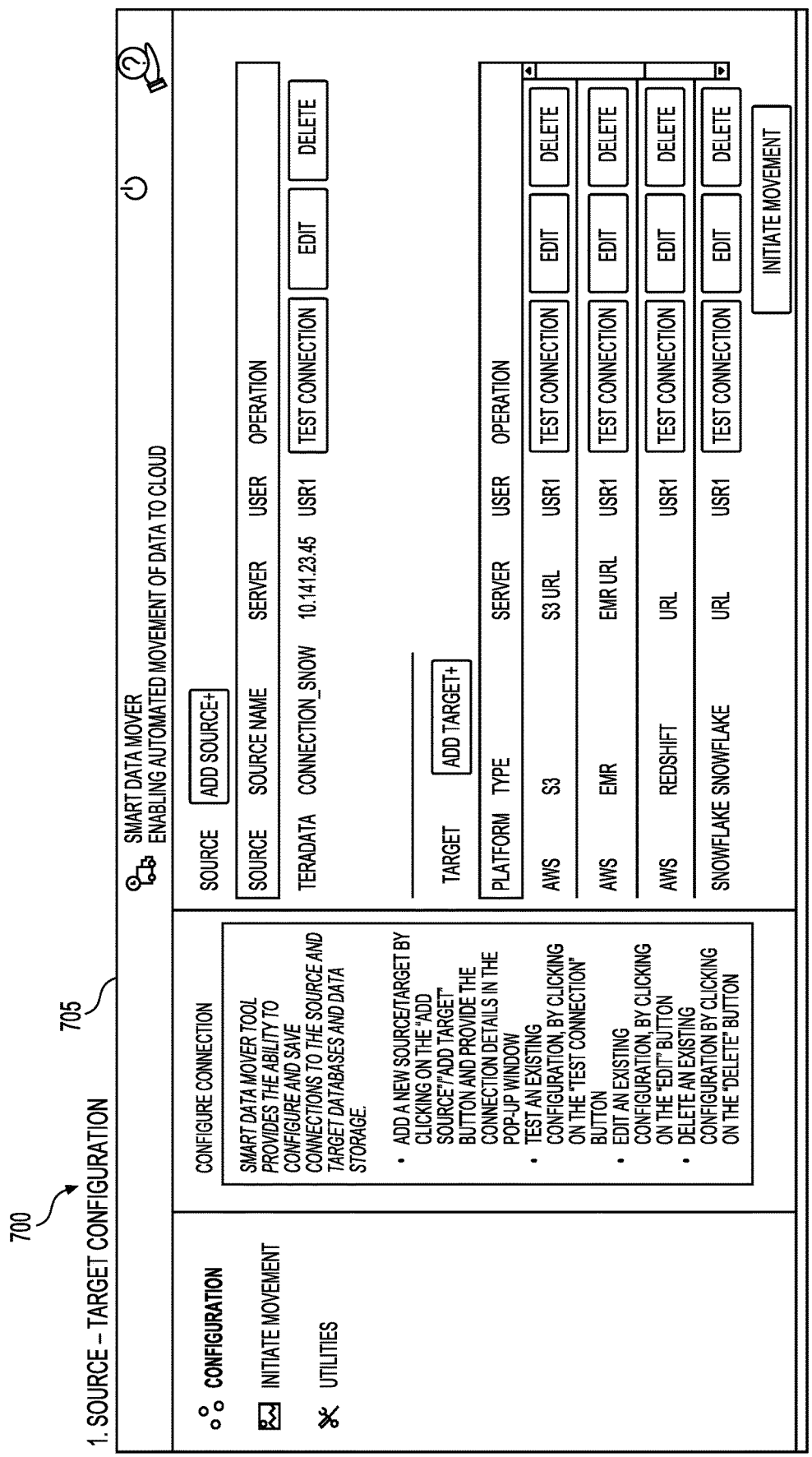
Figure 7B:
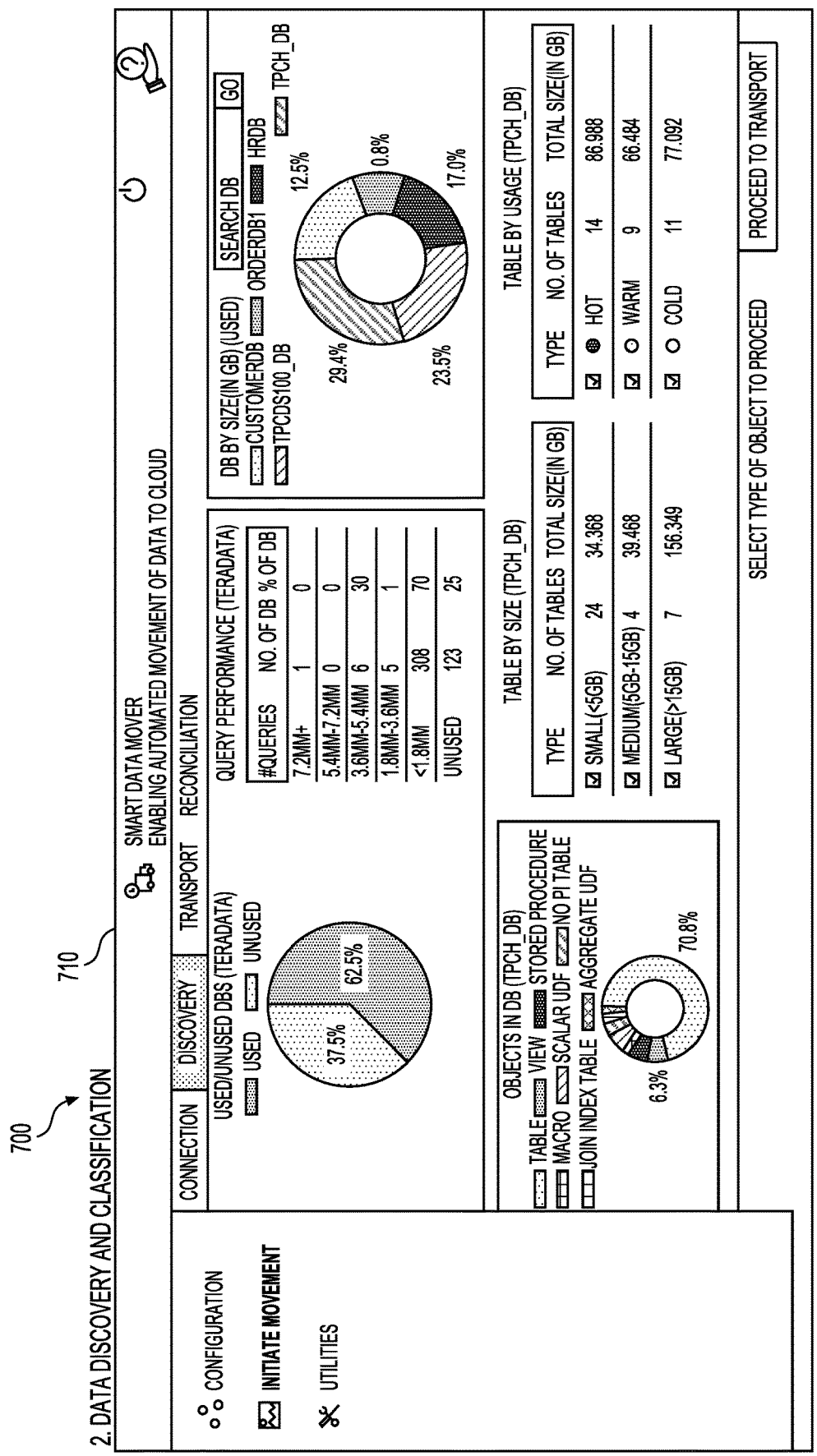
Figure 7D:
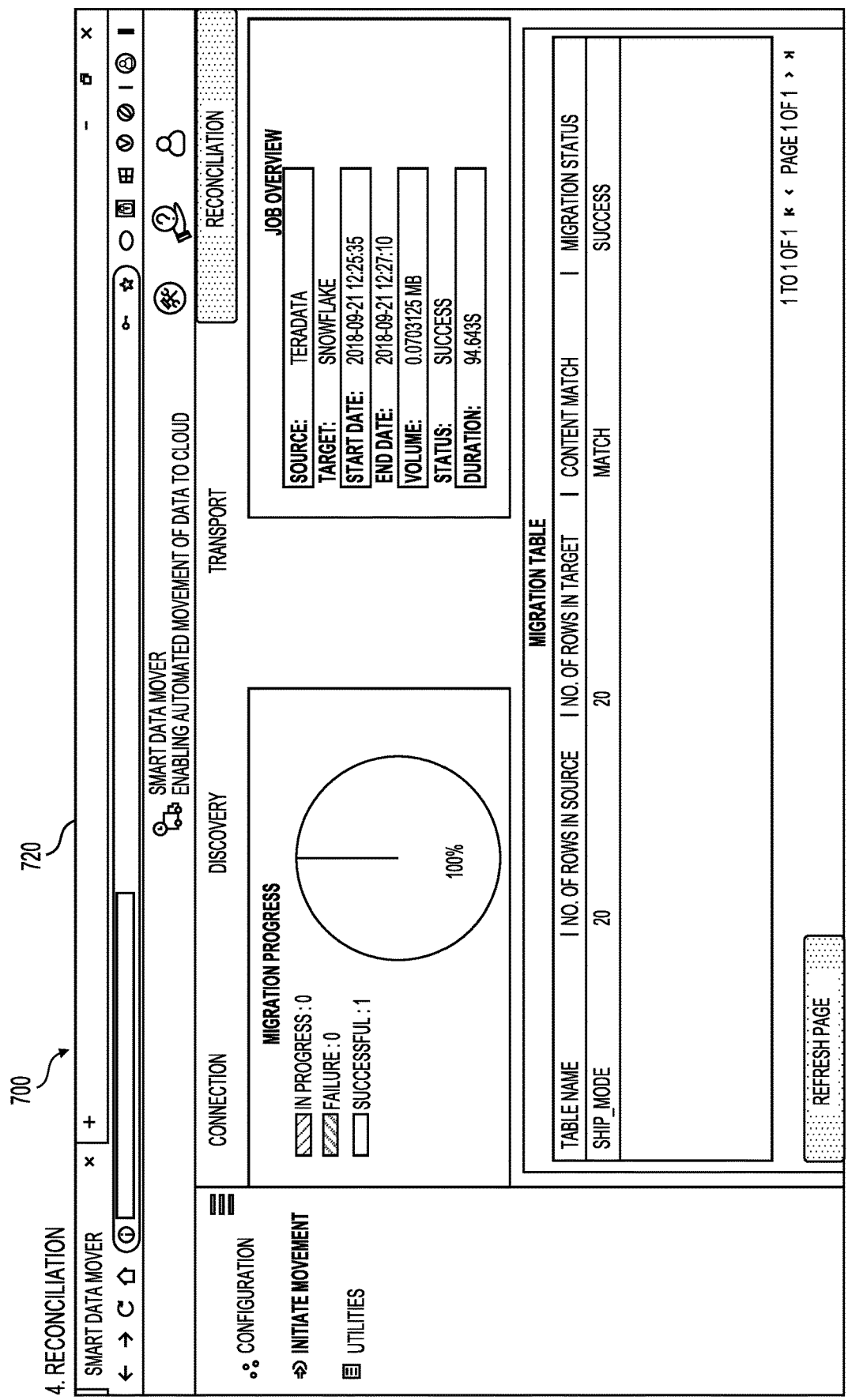

FIG. 6 illustrates another block diagram representation of a system 600 for data transition from a source to cloud, according to an example implementation of the present disclosure. The system 600 for data transitions captures, curates, and consumes data as shown in 605. Pre transition stage 610 may include discovery 610-1, classification 610-2, and source baseline metrics 610-3. During transition stage 615 may include component redesign and migration 615-1, data selection and filtering 615-2, and data extraction and migration 615-3. Further, post transition stage 620 may include reconciliation 620-1, baseline comparison (target) 620-2, and validation checks 620-3. During all the three stages review and audit may be performed as indicated 625 and the output may be stored in a knowledge base 630 for future use.

The system 600, system 200, and architecture 100 provide for automating a process of source DWH movement to cloud. The system 600, 200, 100 help with the automation of the objects identification, metadata extractions, automated data type mapping, target data definition script creation, data extraction in bulk using source native optimized utilities, users and access control mapping to the target DWH, binary object movement, end-to-end audit report, and reconciliation reports. When done manually, this process of creating the source tables in the target DWH is time-consuming and effort intensive including assessment, scripting and validation. Hence, the present disclosure provides for reducing the effort spent to create a script for each table to be moved.

The system 600, 200, 100 are aligned to a structured data transition approach, provide non-invasive, light weight solution, have no vendor-lock in/additional licensing cost, provide ease of extensibility to any source DW and target cloud DWH, are source version agnostic, provide multi-cloud target support, support for UI and batch mode, optimized performance with use of source and target native utilities, provide dependency graph of unsupported objects, data discovery based on query usage, database usage etc., and generate reconciliation reports formetadata audit, md5 checksum, row count, keywords gap report, and load error report.

FIGS. 7a-7d schematically illustrate a lifecycle 700 of data transition, according to an example implementation of the present disclosure. As can be seen, at 705, source-target configuration may be performed, at 710, data discovery and classification may be performed, at 715, schema generation and data loading are performed and, finally at 720, reconciliation is performed to confirm there are no errors.

Figure 8:
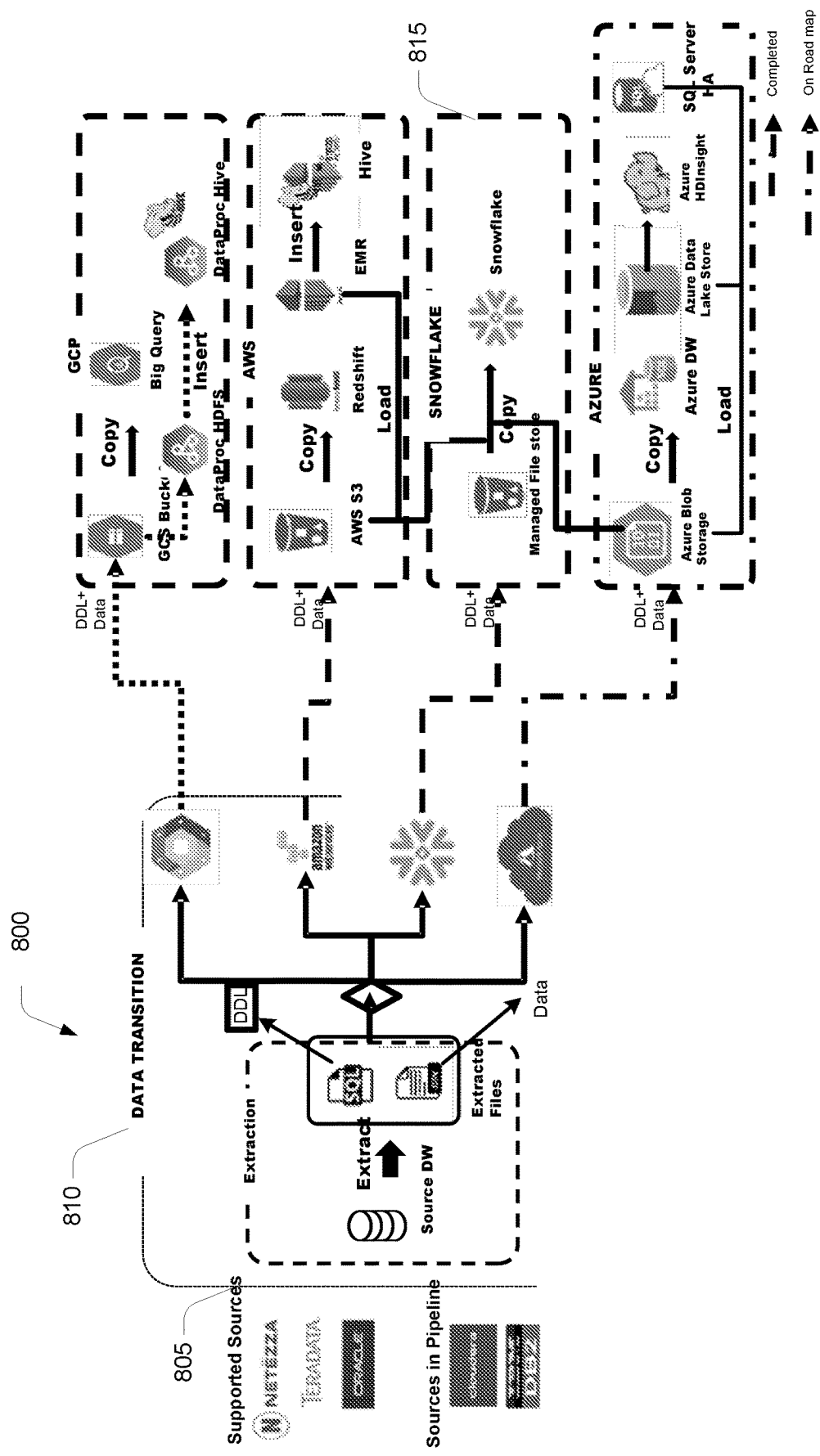
FIG. 8 illustrates an alternative architecture for data transition, according to an example embodiment of the present disclosure.

FIG. 8 illustrates another data transition architecture 800, according to an example of the present disclosure. Data from source 805, such as source supported by Netezza, Teradata, and Oracle. At 810, data transition may be performed, where various ETL operations may be performed. For instance, DDL extraction may be performed and extracted data may be moved to target database 815, such as azure, AWS, snowflake, etc.

The present disclosure provides for dramatically reducing effort in moving schema, data, ETL Transformations from any on premise DWH/ETL to a cloud-based ETL. Further, substantial reduction in data discovery may be achieved due to diagnosis of existing DWH and ETL on premise to classify tables in the source database 110 based on query usage etc. Additionally, post-migration risks may be reduced due to end-end audit reports, DWH specific keywords gaps, and data load error reports.

Figure 9A:
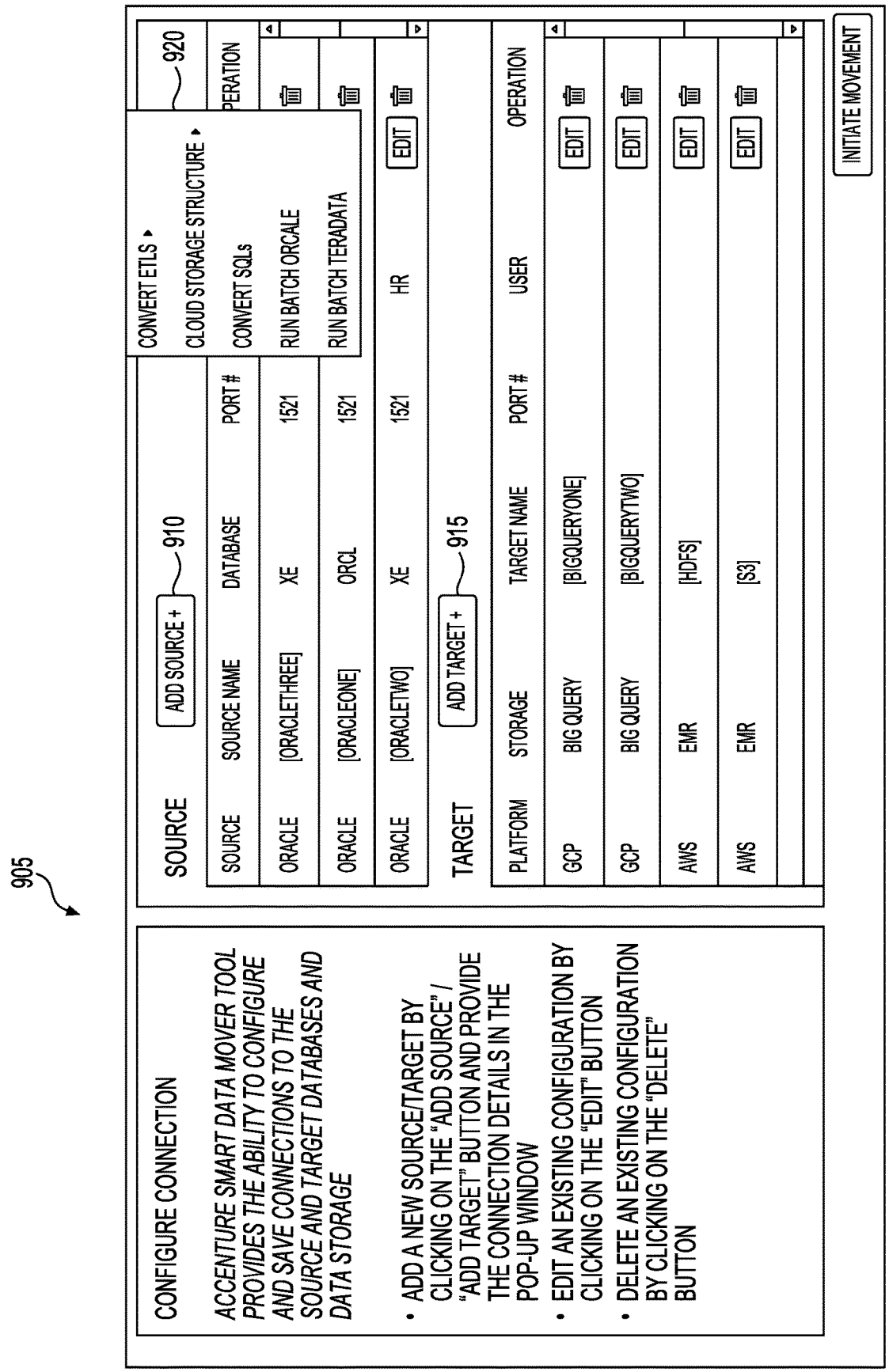
FIGS. 9a-9e illustrate various screenshots of a data transition system, according to an example embodiment of the present disclosure.
Figure 9B:
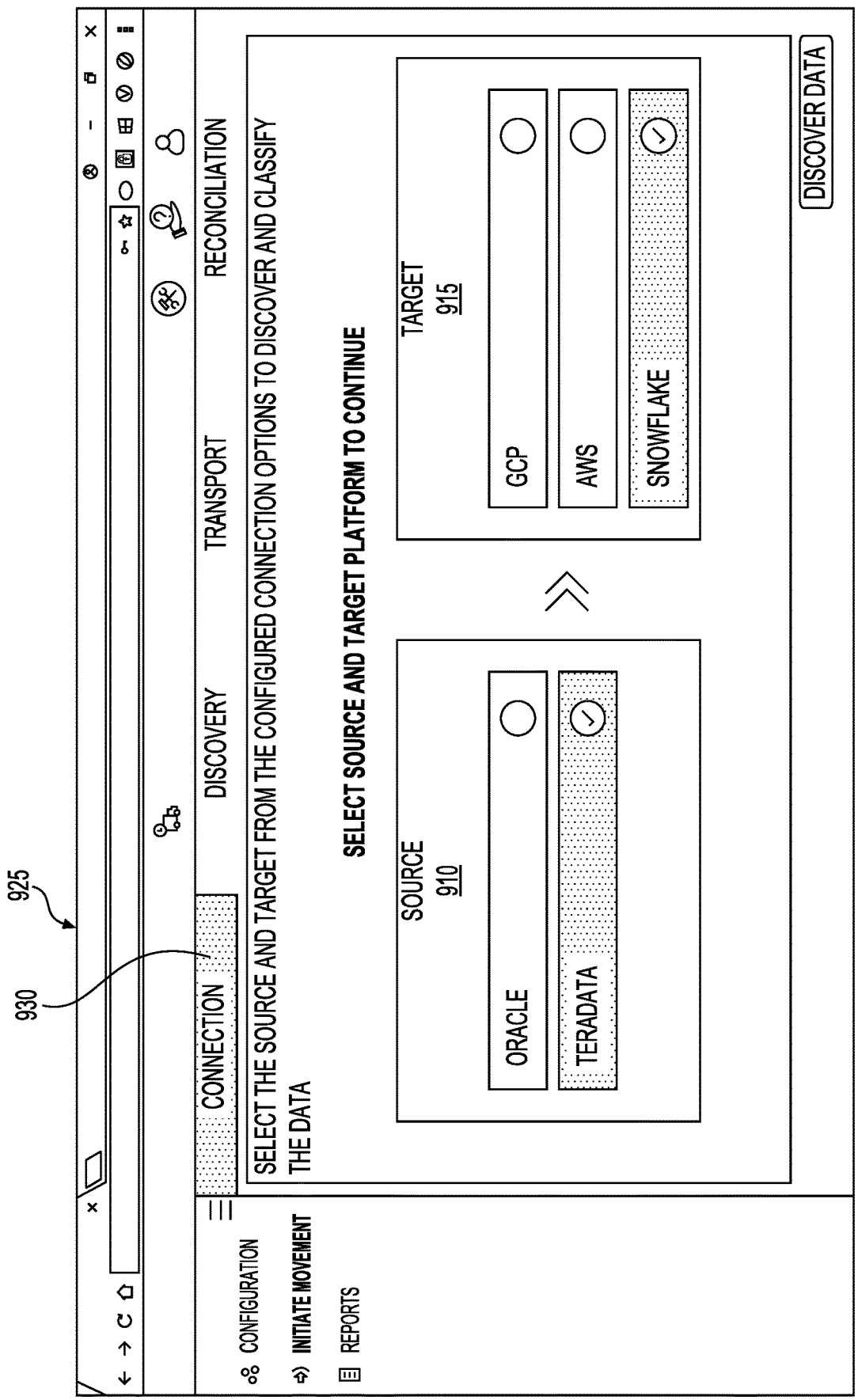
Figure 9C:
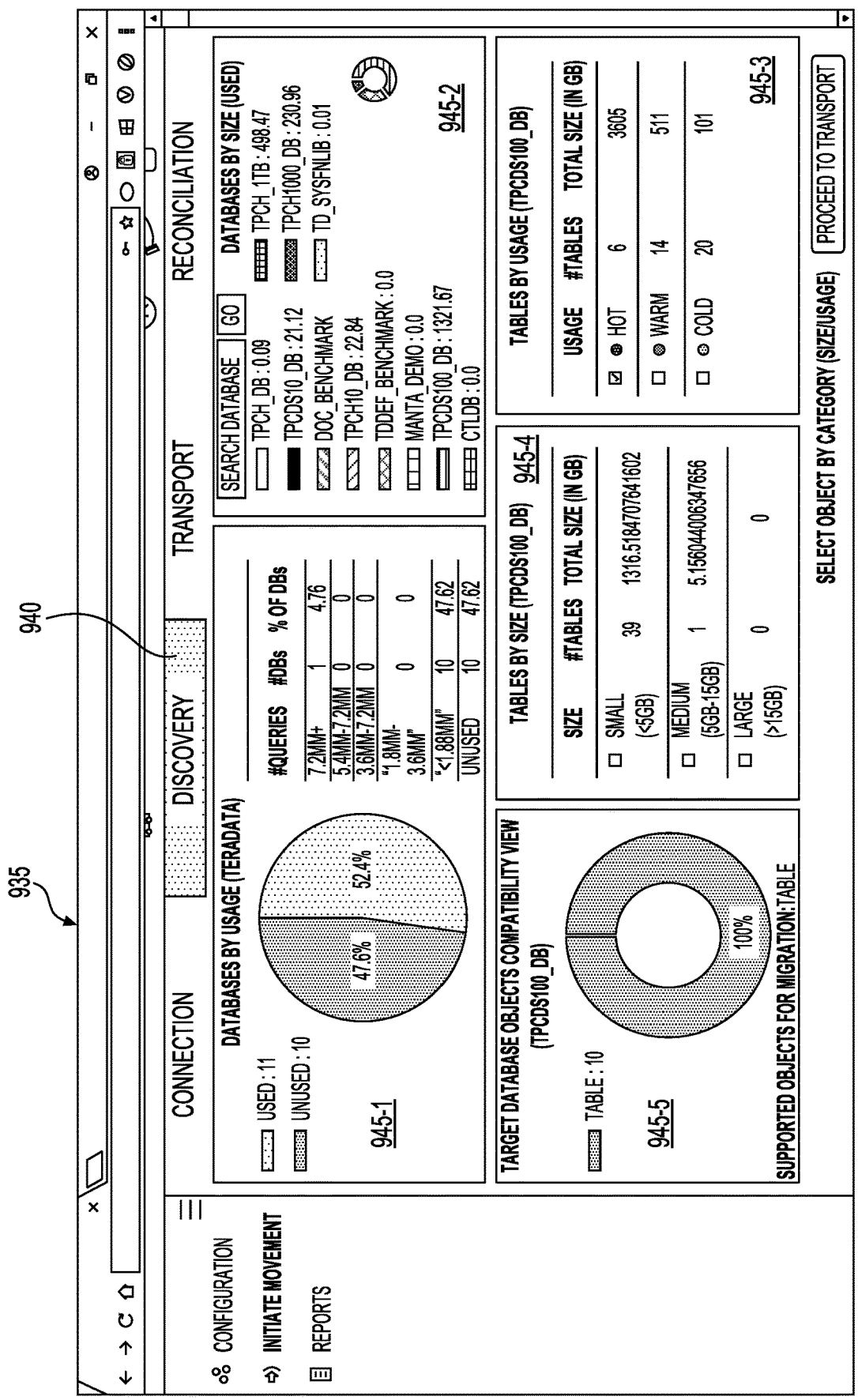

FIGS. 9a-9e illustrate multiple screenshots of system implementing data transition of the present disclosure, according to an example implementation of the present disclosure. FIG. 9a illustrates a screenshot 905, which shows a source 910 and a target 915 and options 920 indicating various operations that can be performed. FIG. 9b illustrates a screenshot 925, which indicates data transition in a connectivity stage 930, where the source 910 and the target 915 may be selected. FIG. 9c illustrates a screenshot 935, which shows details pertaining to a discovery stage 940, where various reports, such as, database by usage 945-1, database by size 945-2, tables by usage 945-3, tables by size 945-4, and target database objects 935-5, may be generated.

Figure 9D:
Figure 9E:
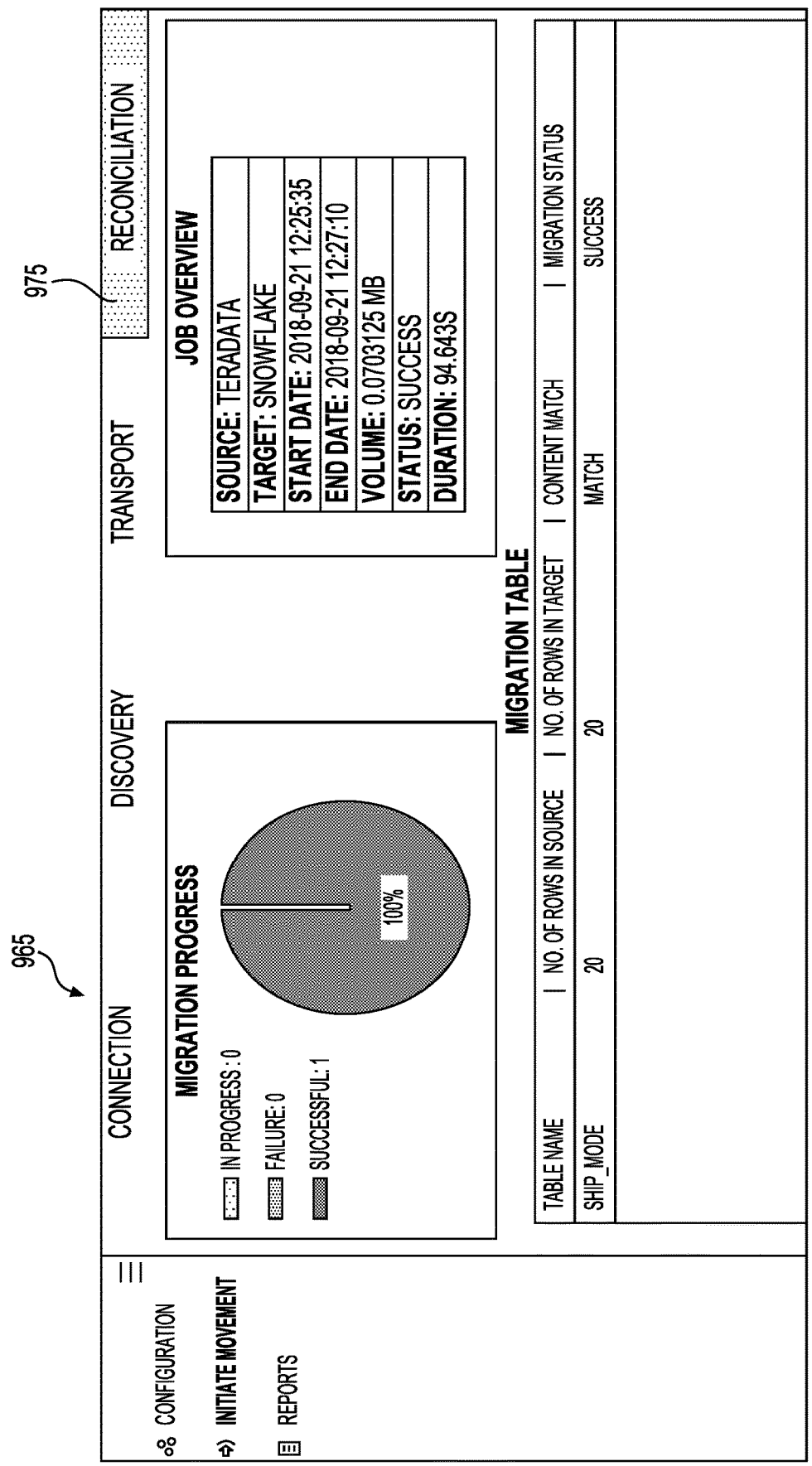

FIG. 9d illustrates a screenshot 950, which shows data transition in a transport stage 955, where various details pertaining to transportation of data may be shared, such as migration status 960-1, table name 960-2, table size 960-3, etc. FIG. 9e illustrates a screenshot 970, which shows data transition in a reconciliation stage 975, where an overall job overview 980-1, details pertaining to migration completion 980-2, and a migration table 980-3 may be provided.

The following table lists the elements from an Informatica Job, however, it may be appreciated that there may be additional elements:

```
<?xml version="1.0" encoding="Windows-1252"?>
<POWERMART -->
<REPOSITORY -->
<FOLDER -->
  <SOURCE -->
    <FLATFILE --/>
    <TABLEATTRIBUTE --/>
    <SOURCEFIELD --/>
  </SOURCE>
  <TARGET -->
    <TARGETFIELD --/>
  </TARGET>
  <MAPPING -->
    <TRANSFORMATION -->
      <TRANSFORMFIELD --/>
      <TABLEATTRIBUTE --/>
    </TRANSFORMATION>
    <INSTANCE --/>
    <CONNECTOR --/>
  </MAPPING>
</FOLDER>
</REPOSITORY>
</POWERMART>
```

The following table provides pseudo code for ETL Conversion.

| | |
|---|---|
| <?xml version="1.0" encoding="Windows-1252"?><br><POWERMART --><br><REPOSITORY --><br><FOLDER --><br><SOURCE --><br>  <FLATFILE --/><br>  <TABLEATTRIBUTE --/><br>  <SOURCEFIELD --/><br></SOURCE><br><TARGET --><br>  <TARGETFIELD --/><br></TARGET><br><MAPPING --><br>  <TRANSFORMATION --><br>    <TRANSFORMFIELD --/><br>    <TABLEATTRIBUTE --/><br>  </TRANSFORMATION><br>  <INSTANCE --/><br>  <CONNECTOR --/><br></MAPPING><br></FOLDER><br></REPOSITORY><br></POWERMART> | import sys<br>from awsglue.job import Job<br><br>## @params: [JOB_NAME]<br>args = getResolvedOptions(sys.argv, ['JOB_NAME'])<br><br>## @type: DataSource<br>sourcename = glueContext.create_dynamic_frame.from_catalog(database, table_name, transformation_ctx )<br><br>## @type: ApplyMapping<br>mappingname = ApplyMapping.apply(frame, mappings, transformation_ctx )<br><br>## @type: DataSink<br>destname = glueContext.write_dynamic_frame.from_options(frame, connection_type, connection_options, format, transformation_ctx )<br>job.commit( ) |

From the graph, the disclosure uses the third party API to identify all the possible paths that could be taken in a ETL Job based on business logic. To the third party API the disclosure will pass the StartNode and end Node details which are captured from the xml using the xpath. From each node of the graph that represents the block, the source, and the target may be identified. The code provided above is an example for the same. Based on the source and the target mapping elements, the corresponding templates may be extracted or loaded and converted into a PySpark code. The disclosure may be configuration based with every new ETL repository being pluggable and configured to be converted to an intermediary format and finally converted to a cloud based ETL. The embedded SQLs may be extracted using xpath, for each embedded SQL in the ETL Job, convert the SQL to a syntax accepted in target data warehouse.

Details pertaining to the components are provided below:
Config file: A specific config file may be created for each ETL tool. Config file may be used to define ETL tool specific inputs in the utility. This may be the only varying configurable component in the tool.
XMLReader: This module may be responsible to work on any XML. All the XML functionality may be placed here to handle most ETL mapping.
Informatica Reader: This module extends the XMLReader to read and parse the Informatica ETL metadata template xml. This class may implement any specific/custom function present in source ETL mapping.
Interface object: Create the job, which covers the flow of the data, functions and transformation present to the corresponding PySpark code.
Future source: Other sources may be added to the Utility by just plugging in the config file for the ETL source repository.

The present disclosure provides for end-to-end migration to the cloud starting with discovering the data to diagnose the existing on premise environment, suggest movement to the cloud. The present disclosure also provides for automated conversion of ETL to Cloud based ETL like PySpark, Glue, Mattilion, reconciliation reports including column summation, row count check, and audit reports to indicate the metadata not moved to the target.

Figure 10:
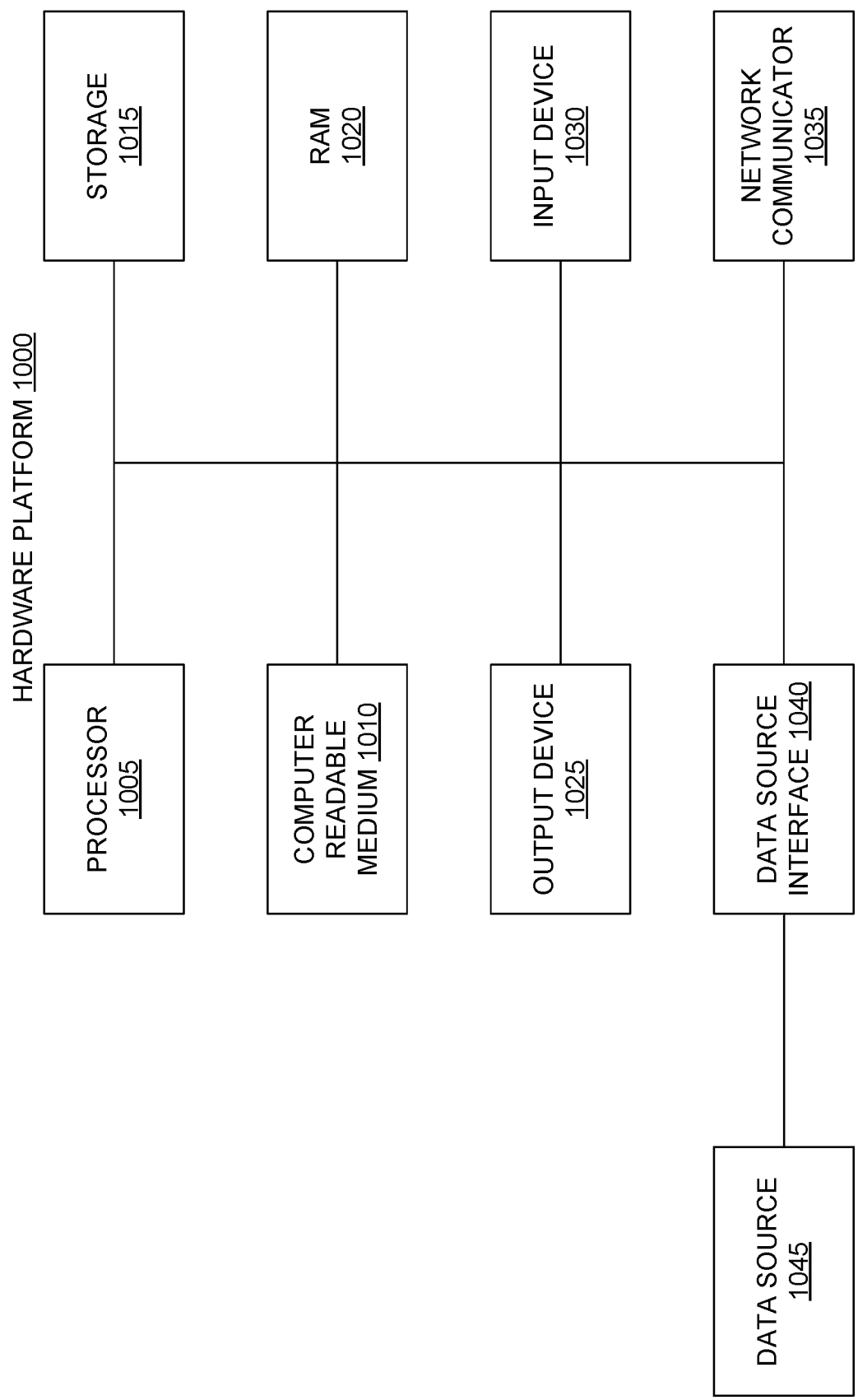
FIG. 10 illustrates a hardware platform for embodiment of the inspection system, according to an example embodiment of the present disclosure.

FIG. 10 illustrates a hardware platform 1000 for embodiment of the inspection system 102, according to an example embodiment of the present disclosure. Particularly, computing machines such as but not limited to internal/external server clusters, quantum computers, desktops, laptops, smartphones, tablets and wearables which may be used to execute the inspection system 102 or may include the structure of the hardware platform 1000. The hardware platform 1000 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over the FIG. 10, the hardware platform 1000 may be a computer system 1000 that may be used with the examples described herein. The computer system 1000 may represent a computational platform that includes components that may be in a server or another computer system. The computer system 1000 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 1000 may include a processor 1005 that executes software instructions or code stored on a non-transitory computer readable storage medium 1010 to perform methods of the present disclosure. The software code includes, for example, instructions to analyze operational data, detect an error, and generate notifications and alerts.

The instructions on the computer readable storage medium 1010 are read and stored the instructions in storage 1015 or in random access memory (RAM) 1020. The storage 1015 provides a large space for keeping static data where at least some instructions could be stored for later execution. The stored instructions may be further compiled to generate other representations of the instructions and dynamically stored in the RAM 1020. The processor 1005 reads instructions from the RAM 1020 and performs actions as instructed.

The computer system 1000 further includes an output device 1025 to provide at least some of the results of the execution as output including, but not limited to, visual information to the employees about the solution and response to their query. The output device 1025 can include a display on computing devices and virtual reality glasses. For example, the display can be a mobile phone screen or a laptop screen. GUIs and/or text are presented as an output on the display screen. The computer system 1000 further includes input device 1030 to provide a user or another device with mechanisms for entering data and/or otherwise interact with the computer system 1000. The input device may include, for example, a keyboard, a keypad, a mouse, or a touchscreen. In an example, output of a bot is displayed on the output device 1025. Each of these output devices 1025 and input devices 1030 could be joined by one or more additional peripherals.

A network communicator 1035 may be provided to connect the computer system 1000 to a network and in turn to other devices connected to the network including other clients, servers, data stores, and interfaces, for instance. The network communicator 1035 may include, for example, a network adapter such as a LAN adapter or a wireless adapter. The computer system 1000 includes a data source interface 1040 to access data source 1045. A data source is an information resource. As an example, a database of exceptions and rules may be a data source. Moreover, knowledge repositories and curated data may be other examples of data sources.

Figure 11A:
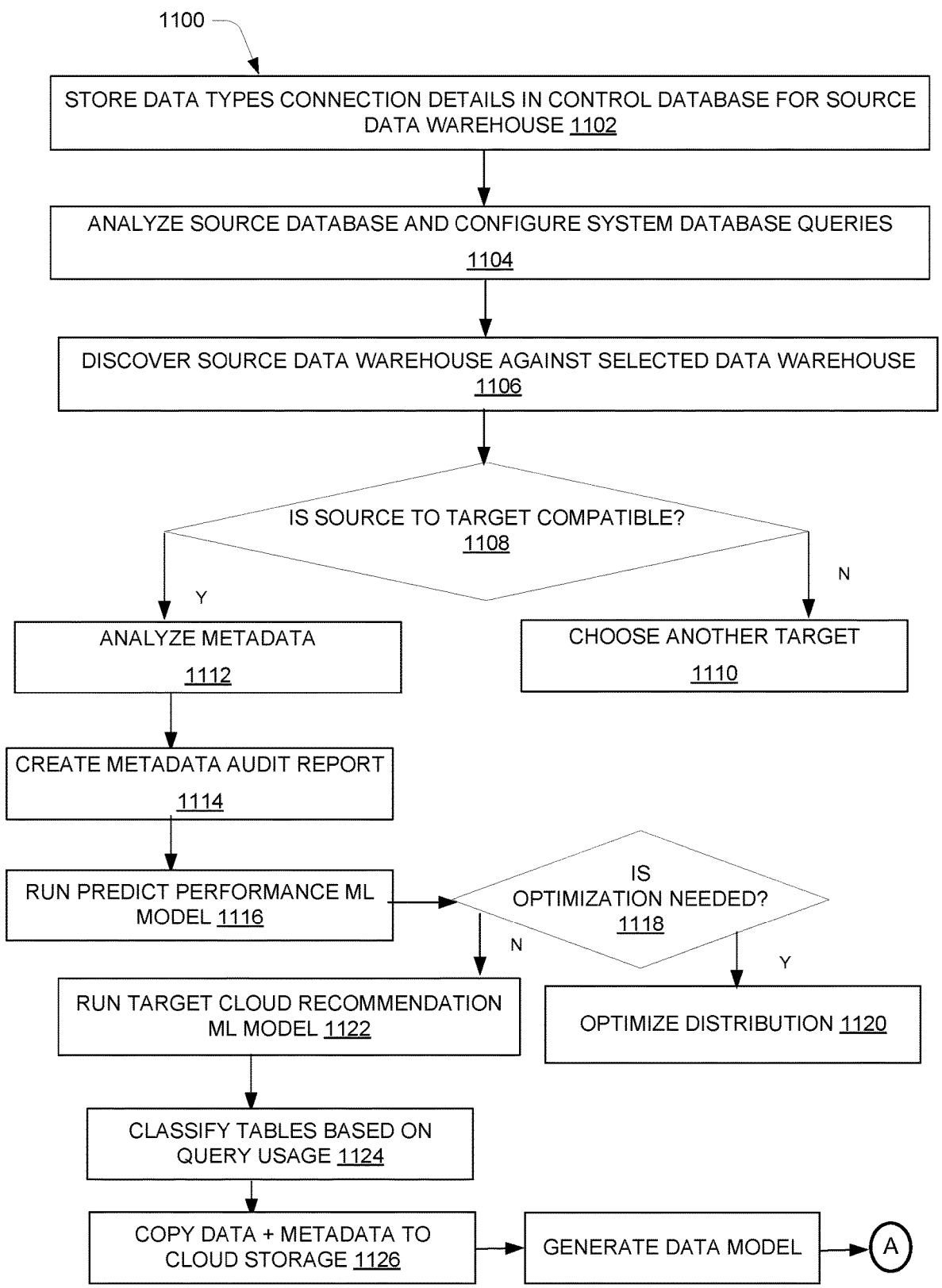
FIGS. 11a-11b illustrate a method for data transition, according to an example embodiment of the present disclosure.
Figure 11B:
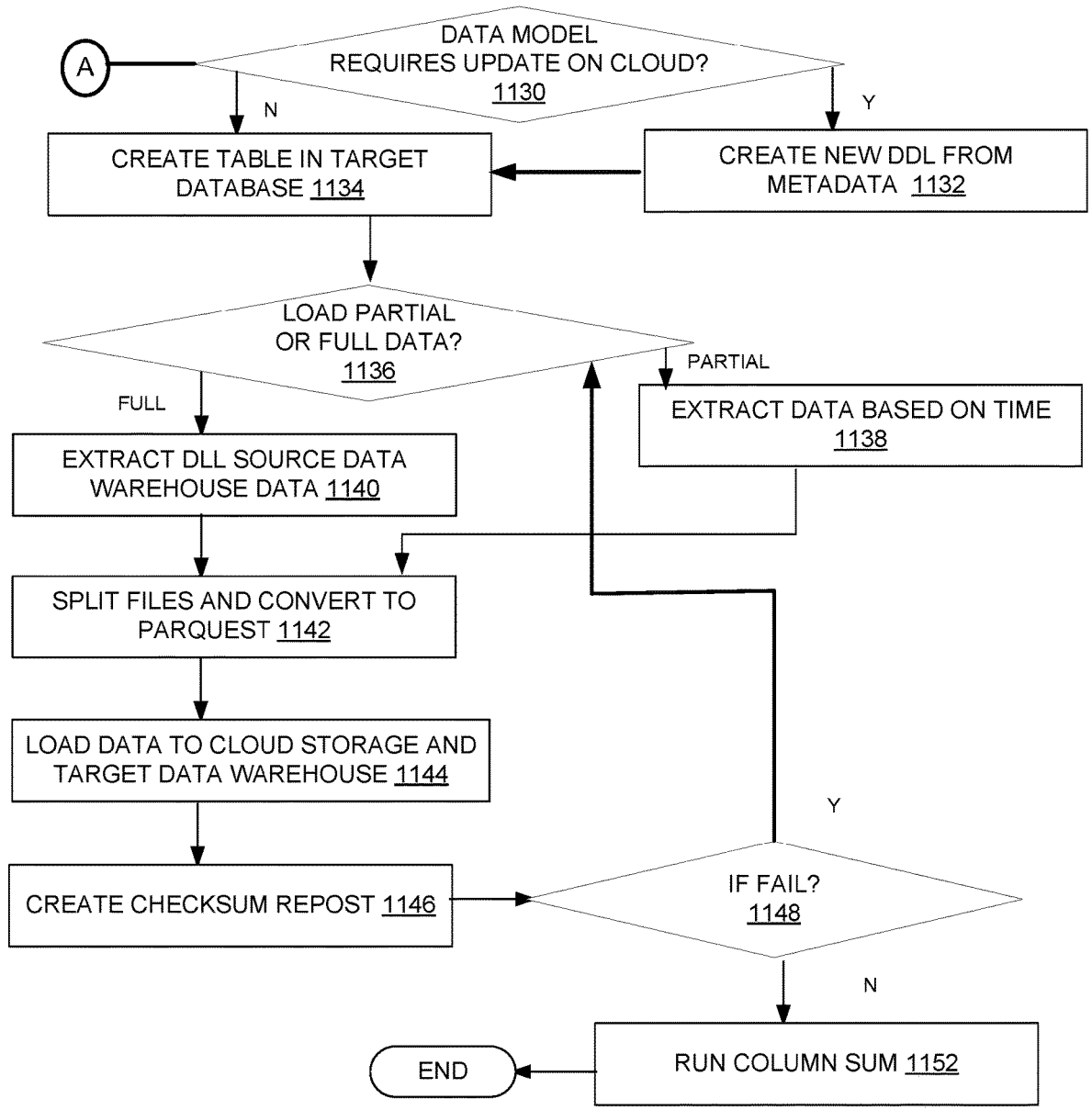

FIGS. 11*a*-11*b* illustrate a method 1100 to be performed for data transition from a source to a Cloud target, in accordance with an example of the present disclosure. In an example, the method 1100 may be performed by systems and components described above.

Referring method 1100, at block 1102, data type connection details may be stored in control database for source data warehouse. At block 1104, the source database is analyzed and system database queries are configured. At block 1106, source database may be discovered against selected target database and a location and query performance may be predicted in a selected cloud environment based on the data. At block 1108, it is ascertained whether source to target is compatible and data values may be prompted based on historical data of past migration of the cloud. In an example, the historical data may be utilized to train models for examining the data, executing queries, and responding to the queries, where the models may be generated based on the data and metadata corresponding to the tables. In case of incompatibility, at block 1110, another target is chosen; however, in case of compatibility, metadata may be analyzed at block 1112.

At block 1114, metadata audit report may be created. At block 1116, predict performance ML model may be run. At block 1118, it may be ascertained whether optimization is required. In case optimization is required, the distribution is optimized at block 1120, else the method proceeds to block 1122, where target cloud recommendation ML model may be run. At block 1124, tables based query usage may be classified.

At block 1126, metadata and data may be copied to cloud storage. At block 1128, data model may be generated. At block 1130, it is ascertained whether data model requires an update on cloud. In case at block 1130, it is ascertained that an update is required, at block 1132, new DDL may be created from metadata. In case at block 1130, it is ascertained that an update is not required, at block 1134, a table in target data warehouse is created.

At block 1136, it is ascertained whether full or partial data is loaded. In case partial data is loaded, at block 1138 data based on time may be extracted. However, in case full data is loaded, all source data warehouse may be extracted, at block 1140. At block 1142, data file may be split and converted to parquet. At block 1144, data may be loaded to cloud storage and target data warehouse. At block 1146, checksum repost may be created. At block 1148, it is ascertained whether there is a failure. In case of failure, a reload is performed and method braches to block 1150. In case of success, column sum check is run at block 1152.

Figure 12A:
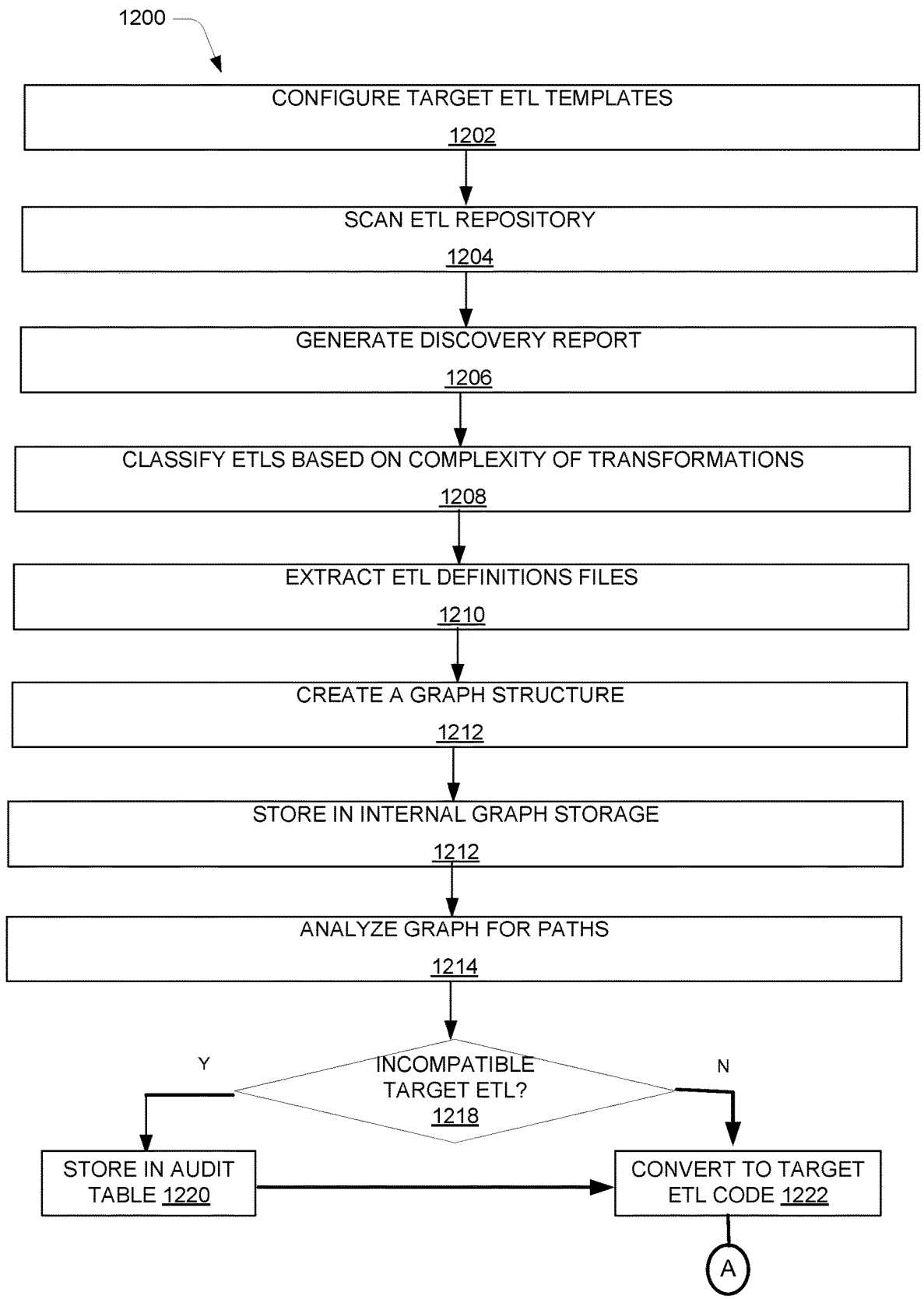
FIGS. 12a-12b illustrate an alternative method for data transition, according to an example embodiment of the present disclosure.
Figure 12B:
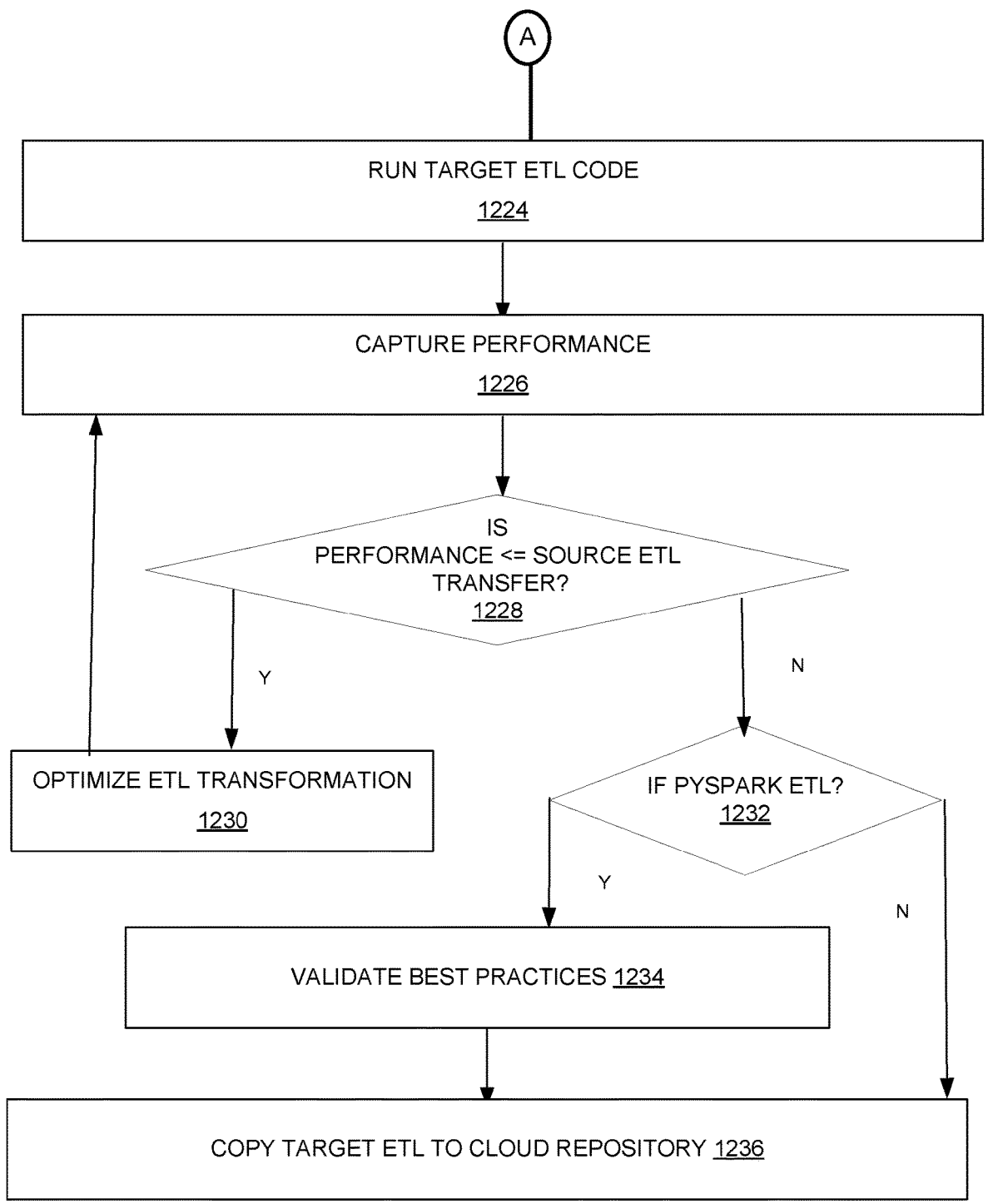

FIGS. 12*a*-12*b* illustrate another method 1200 to be performed for data transition from a source to a cloud target, in accordance with an example of the present disclosure. In an example, the method 1200 may be performed by systems and components described above.

Referring to method 1200, at block 1202, target ETL templates may be configured. At block 1204, ETL repository may be scanned. At block 1206, discovery report(s) may be generated. At block 1208, ETLs may be classified based on complexity of transformation. At block 1210, ETL definition files may be extracted. At block 1212, a graph structure may be created. At block 1214, the graph structure may be stored in an internal graph storage. At block 1216, graphs may be analyzed for paths. At block 1218, it is ascertained, whether target ETL is incompatible. In case at block 1218 it is ascertained that the target ETL component is incompatible, at block 1220, the target ETL component is stored in a corresponding table. However, in case at block 1218, it is ascertained that the target ETL component/s is compatible, at block 1222, the target ETL is converted to target ETL code. The process may be repeated until entire graph paths are covered.

At block 1224, a target ETL code may be run to provide for data transition. At block 1226, performance of target ETL code may be captured, upon running the code.

At block 1228, it may be ascertained whether the target ETL performance is less than or equal to source transfer. In case at block 1228, it is ascertained that the target ETL performance is less than or equal to the source transfer, ETL transformation is optimized at block 1230 and the process is repeated. In case at block 1228, it is ascertained that the target ETL performance is greater than the source transfer, at block 1232, a determination is made if the target ETL is PySpark ETL. In case it is determined that it is PySpark ETL, at block 1234, best practices may be validated. In case it is determined that it is not PySpark ETL, at block 1236, target ETL may be copied cloud repository, where the method ends. The target ETL can be any other Cloud based ETL Like AWS Glue, Matillion and the base PySpark code will require minimum annotation level changes to make it compliant to another Cloud based ETL.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims and their equivalents in which all terms are meant in their broadest reasonable sense unless otherwise indicated.

What is claimed is:

1. A system for migrating data from a source data warehouse to a cloud environment, the system comprising:
   a processor;
   a location recommender coupled to the processor to:
      store data type connection information;
      predict a location in the cloud environment based on the migrating data; and
      predict query performance of the cloud environment and classify tables in the source data warehouse based on query usage, wherein the location recommender predicts the location based on a table accessed by a referential key and wherein the query performance is determined prior to migration to a target data warehouse based on a source database query execution time; and
   a data identifier coupled to the processor to:
      provide data values based on historical data pertaining to past migration of the cloud, wherein the historical data is to train models for examining the data, executing queries, and responding to the queries, the models being generated based on data and metadata corresponding to the tables;
      identify incorrect and sensitive data;
      obfuscate the incorrect and the sensitive data; and
      load the migrating data on the cloud environment.

2. The system as claimed in claim 1, wherein the data identifier is to map object compatibility between a source data warehouse and a target data warehouse in the cloud environment.

3. The system as claimed in claim 1 further including a data determiner to:
   determine data usage of a source data warehouse at a database level and within a database at a table level;
   determine a size of the database; and
   reconcile database migration objects based on content and row counts in a source table in the source data warehouse and a migrated table in the cloud environment, wherein the source table stores the data to be migrated and the migrated table is indicative of a table migrated from the source data warehouse to the cloud environment.

4. The system as claimed in claim 1 comprising a report generator to generate an audit report of a source table in the source data warehouse and a target table in the cloud environment, wherein the source table stores the data to be migrated and the target table receives the data.

5. The system as claimed in claim 1, wherein the location recommender further predicts the location based on one of data usage, frequency of usage, and volume of data.

6. The system as claimed in claim 1, wherein the query performance is further determined based on one of dependent variables, source database specific variables, and a volume of data.

7. A method for migrating data from a source data warehouse to a cloud environment, the method including:
   storing data type connection information;
   predicting a location in the cloud environment based on the migrating data;
   predicting query performance of the cloud environment and classifying tables in the source data warehouse based on query usage, wherein the location recommender predicts the location based on a table accessed by a referential key and wherein the query performance is determined prior to migration to a target data warehouse based on a source database query execution time;
   providing data values based on historical data of past migration of the cloud, wherein the historical data is to train models for examining the data, executing queries, and responding to the queries, the models being generated based on data and metadata corresponding to the tables;
   identifying incorrect and sensitive data;
   obfuscating the incorrect and the sensitive data; and
   loading the migrating data on to the cloud environment.

8. The method as claimed in claim 7, including mapping object compatibility between a source data warehouse and a target data warehouse in the cloud environment.

9. The method as claimed in claim 7, including:
   determining data usage of a source data warehouse at a database level and within a database at a table level;
   determining a size of the database; and
   reconciling a database migration object based on content and row counts in a source table in the source data warehouse and a migrated table in the cloud environment, wherein the source table stores the data to be migrated and the migrated table is indicative of a table migrated from the source data warehouse to the cloud environment.

10. The method as claimed in claim 7, including generating audit reports of a source table in the source data warehouse and a target table in the cloud environment, wherein the source table stores the data to be migrated and the target table receives the data.

11. The method as claimed in claim 7, including further predicting the location based on one of data usage, frequency of usage, and a volume of data.

12. The method as claimed in claim 7, wherein the query performance is further determined based on one of dependent variables, source database specific variables, and volume of data.

13. The method as claimed in claim 7 including providing a generic framework for monitoring status of different tasks.

14. The method as claimed in claim 13 wherein the monitoring is performed based on storing logging details and debugging.

15. A non-transitory Computer Readable Medium (CRM) including machine instructions and executable by a processor to migrate data from a source data warehouse to a cloud environment, wherein the instructions are to:
   store data type connection information
   predict a location in the cloud environment based on the migrating data;
   predict query performance of the cloud environment and classify tables in the source data warehouse based on query usage, wherein the location recommender predicts the location based on a table accessed by a referential key and wherein the query performance is determined prior to migration to a target data warehouse based on a source database query execution time;

provide data values based on historical data of past migrations, wherein the historical data is to train models for examining the data, executing queries, and responding to the queries, the models being generated based on data and metadata corresponding to the tables;

identify incorrect and sensitive data;

obfuscate the incorrect and the sensitive data; and load the migrating data on the cloud environment.

16. The non-transitory CRM as claimed in claim 15, wherein the instructions are to map object compatibility between a source data warehouse and a destination data warehouse.

17. The non-transitory CRM as claimed in claim 15, wherein the instructions are to:

determine data usage of a source data warehouse at a database level and within a database at a table level;

determine a size of the database; and reconcile a database migration object based on content and row counts in a source table in the source data warehouse and a migrated table in the cloud environment, wherein the source table stores the data to be migrated and the migrated table is indicative of a table migrated from the source data warehouse to the cloud environment.

18. The non-transitory CRM as claimed in claim 15, wherein the instructions are to generate audit reports of a source table in the source data warehouse and a target table in the cloud environment, wherein the source table stores the data to be migrated and the target table receives the data.

19. The non-transitory CRM as claimed in claim 15, wherein the instructions are to further predict the location based on one of data usage, frequency of usage, and volume of data.

20. The non-transitory CRM as claimed in claim 15, wherein the query performance is further determined based on one of dependent variables, source database specific variables, and a volume of data.

* * * * *